United States Patent
Okada

(10) Patent No.: US 10,986,401 B2
(45) Date of Patent: Apr. 20, 2021

(54) IMAGE PROCESSING APPARATUS, IMAGE PROCESSING SYSTEM, AND IMAGE PROCESSING METHOD

(71) Applicant: SONY CORPORATION, Tokyo (JP)

(72) Inventor: Ryohei Okada, Chiba (JP)

(73) Assignee: SONY CORPORATION, Tokyo (JP)

( * ) Notice: Subject to any disclaimer, the term of this patent is extended or adjusted under 35 U.S.C. 154(b) by 223 days.

(21) Appl. No.: 16/098,702

(22) PCT Filed: Apr. 7, 2017

(86) PCT No.: PCT/JP2017/014550
§ 371 (c)(1),
(2) Date: Nov. 2, 2018

(87) PCT Pub. No.: WO2017/195514
PCT Pub. Date: Nov. 16, 2017

(65) Prior Publication Data
US 2019/0138803 A1 May 9, 2019

(30) Foreign Application Priority Data

May 13, 2016 (JP) .............................. JP2016-096697

(51) Int. Cl.
*H04N 21/44* (2011.01)
*G06K 9/00* (2006.01)
(Continued)

(52) U.S. Cl.
CPC ... *H04N 21/44008* (2013.01); *G06K 9/00221* (2013.01); *G06K 9/00369* (2013.01); *G06K 9/60* (2013.01); *H04N 21/4788* (2013.01)

(58) Field of Classification Search
CPC ............. H04N 7/147; H04N 21/44008; H04N 21/4402; H04N 21/44218; G06K 9/00221;
(Continued)

(56) References Cited

U.S. PATENT DOCUMENTS 5,751,337 A * 5/1998 Allen ...................... H04M 3/56
 348/14.07
8,874,090 B2 * 10/2014 Abuan .................... G06F 9/451
 455/416

(Continued)

FOREIGN PATENT DOCUMENTS

| CN | 102474593 A | 5/2012 |
|---|---|---|
| CN | 104782122 A | 7/2015 |

(Continued)

OTHER PUBLICATIONS

Andrew Jones, Magnus Lang, Graham Fyffe, Xueming Yu, Jay Busch, Ian McDowall, Mark Bolas, Paul Debevec; "Achieving Eye Contact in a one-to-many 3D Video Teleconferencing System"; ACM 2009.*

(Continued)

*Primary Examiner* — Shaghayegh Azima
(74) *Attorney, Agent, or Firm* — Chip Law Group

(57) ABSTRACT

To make an object image to be displayed on an image processing apparatus that executes bidirectional communication, for example, an optimum display image according to types of information of a display unit, an object, a viewer, and the like. A display area information acquisition unit acquires display area information of the display unit, and an image acquisition unit acquires an input image including the object to be displayed on the display unit. Further, an image information analysis unit executes input image analysis processing, and a display mode determination unit determines a display mode of the object to be displayed on the (Continued)

display unit, applying an analysis result, and displays an output image generated according to the determined display mode on the display unit. Processing for a missing portion of the object in the case of performing full-size display, correction of a line of sight position, and the like are executed.

13 Claims, 25 Drawing Sheets

(51) Int. Cl.
*H04N 21/4788* (2011.01)
*G06K 9/60* (2006.01)

(58) Field of Classification Search
CPC .. G06K 9/00369; G06K 9/00375; G06K 9/60; G06T 7/10
See application file for complete search history.

(56) References Cited

U.S. PATENT DOCUMENTS

| | | | |
|---|---|---|---|
| 9,538,130 B1* | 1/2017 | Ford | G06T 11/60 |
| 9,743,040 B1* | 8/2017 | Newstadt | H04N 7/15 |
| 2012/0127261 A1* | 5/2012 | Okada | H04N 7/15 |
| | | | 348/14.08 |
| 2012/0147131 A1* | 6/2012 | Yoon | H04N 7/14 |
| | | | 348/14.16 |
| 2012/0155657 A1* | 6/2012 | Takao | H04W 52/0229 |
| | | | 381/57 |
| 2012/0169833 A1* | 7/2012 | Wu | H04N 7/142 |
| | | | 348/14.08 |
| 2012/0229589 A1* | 9/2012 | Barrus | H04N 7/147 |
| | | | 348/14.08 |
| 2013/0106978 A1* | 5/2013 | Lam | H04N 7/147 |
| | | | 348/14.02 |
| 2014/0063174 A1* | 3/2014 | Junuzovic | H04N 7/15 |
| | | | 348/14.02 |
| 2014/0098183 A1* | 4/2014 | Smith | H04N 13/243 |
| | | | 348/14.16 |
| 2014/0333714 A1* | 11/2014 | Kim | H04N 7/142 |
| | | | 348/14.07 |
| 2016/0050388 A1* | 2/2016 | Chang | G06F 3/04886 |
| | | | 348/445 |
| 2016/0050391 A1* | 2/2016 | Schultz | H04N 7/144 |
| | | | 348/14.07 |
| 2016/0295170 A1* | 10/2016 | White | H04N 7/15 |
| 2016/0366369 A1* | 12/2016 | Balasaygun | H04N 7/147 |
| 2018/0367787 A1* | 12/2018 | Nakajima | H04N 13/305 |

FOREIGN PATENT DOCUMENTS

| | | |
|---|---|---|
| EP | 2907302 A2 | 8/2015 |
| JP | 2010-171695 A | 8/2010 |
| JP | 2011-023886 A | 2/2011 |
| JP | 2012-169949 A | 9/2012 |
| JP | 2016-500954 A | 1/2014 |
| JP | 2014-194675 A | 10/2014 |
| JP | 2015/194075 A | 11/2015 |
| JP | 2016-500954 A | 1/2016 |
| KR | 10-2015-0067194 A | 6/2015 |
| WO | 2011/007489 A1 | 1/2011 |
| WO | 2014/058931 A2 | 4/2014 |
| WO | 2015/194075 A1 | 12/2015 |

OTHER PUBLICATIONS

International Search Report and Written Opinion of PCT Application No. PCT/JP2017/014550, dated Jul. 11, 2017, 09 pages of ISRWO.

* cited by examiner

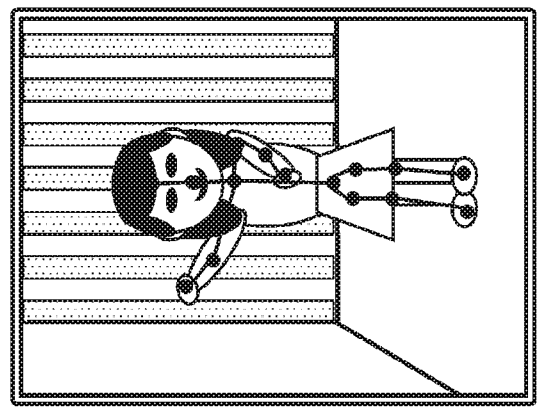
FIG. 9B  BODY PART DETECTION EXAMPLE 2
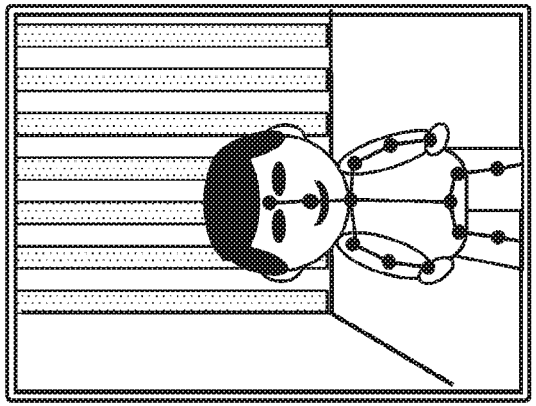
FIG. 9A  BODY PART DETECTION EXAMPLE 1
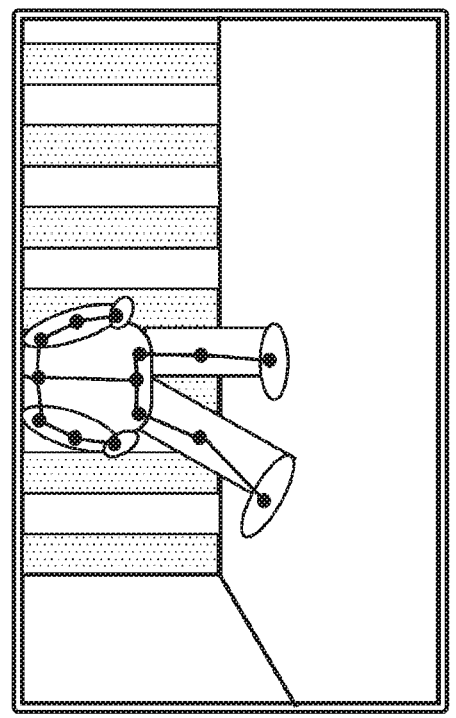
FIG. 9C  BODY PART DETECTION EXAMPLE 3

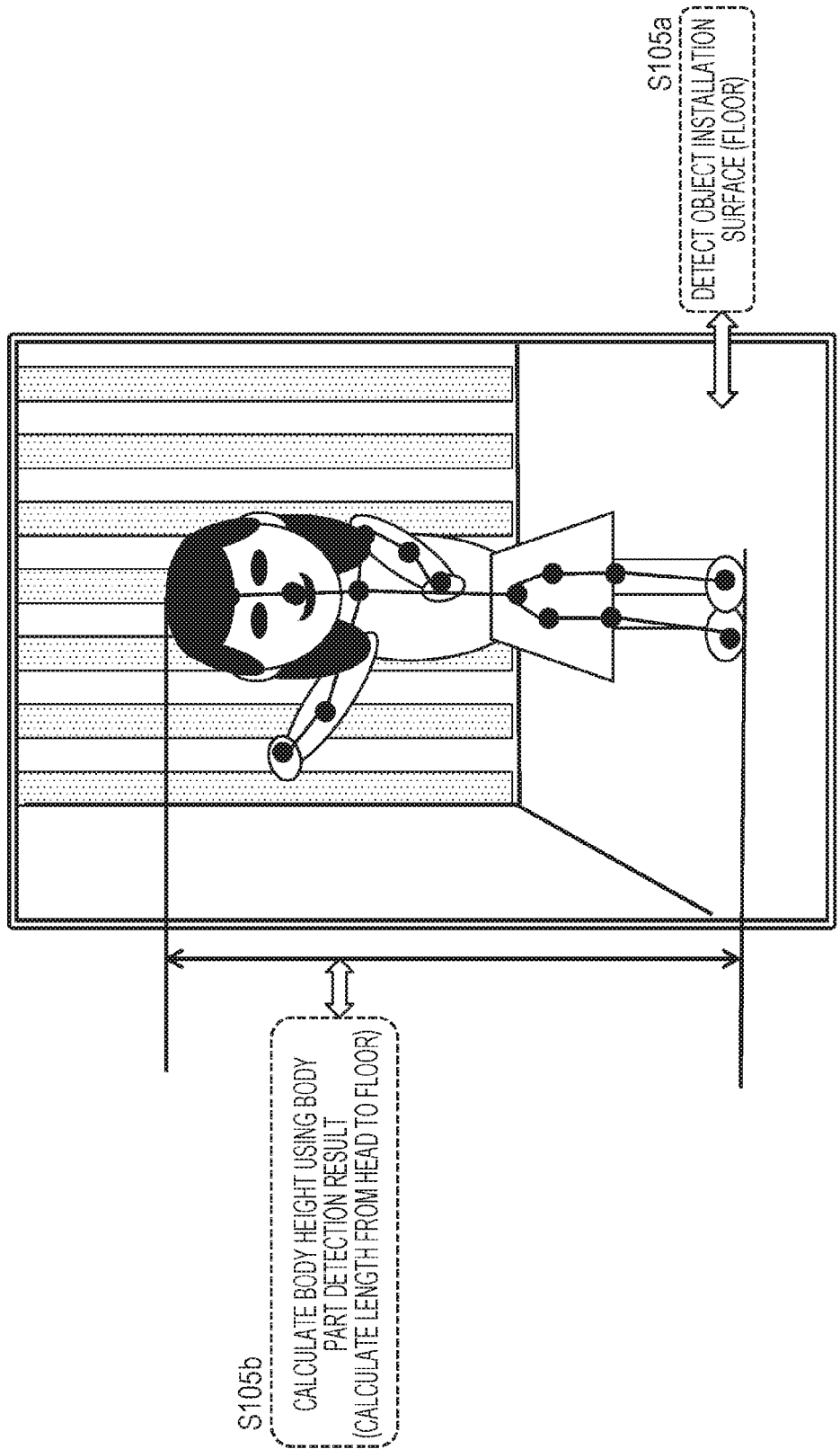

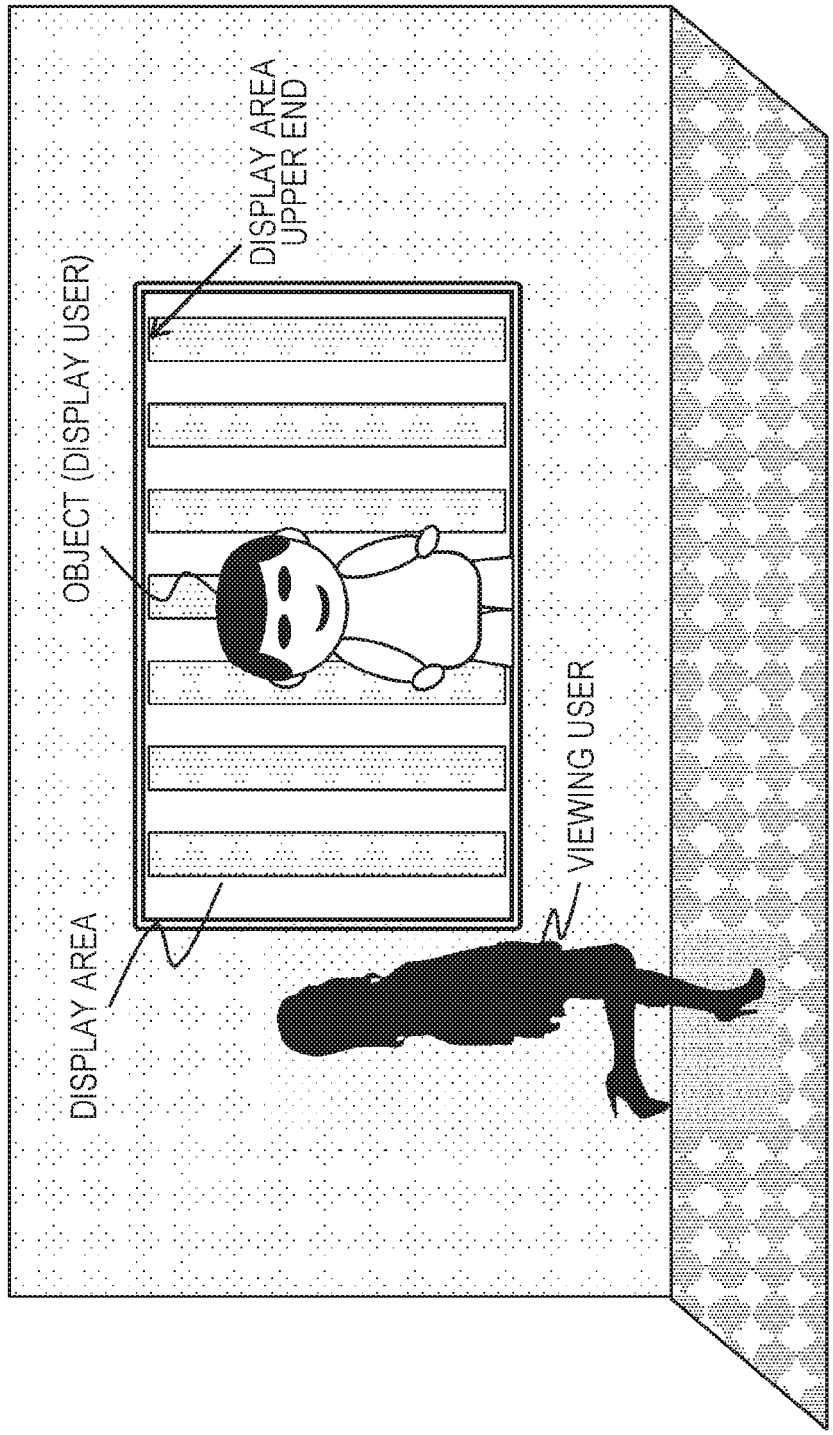

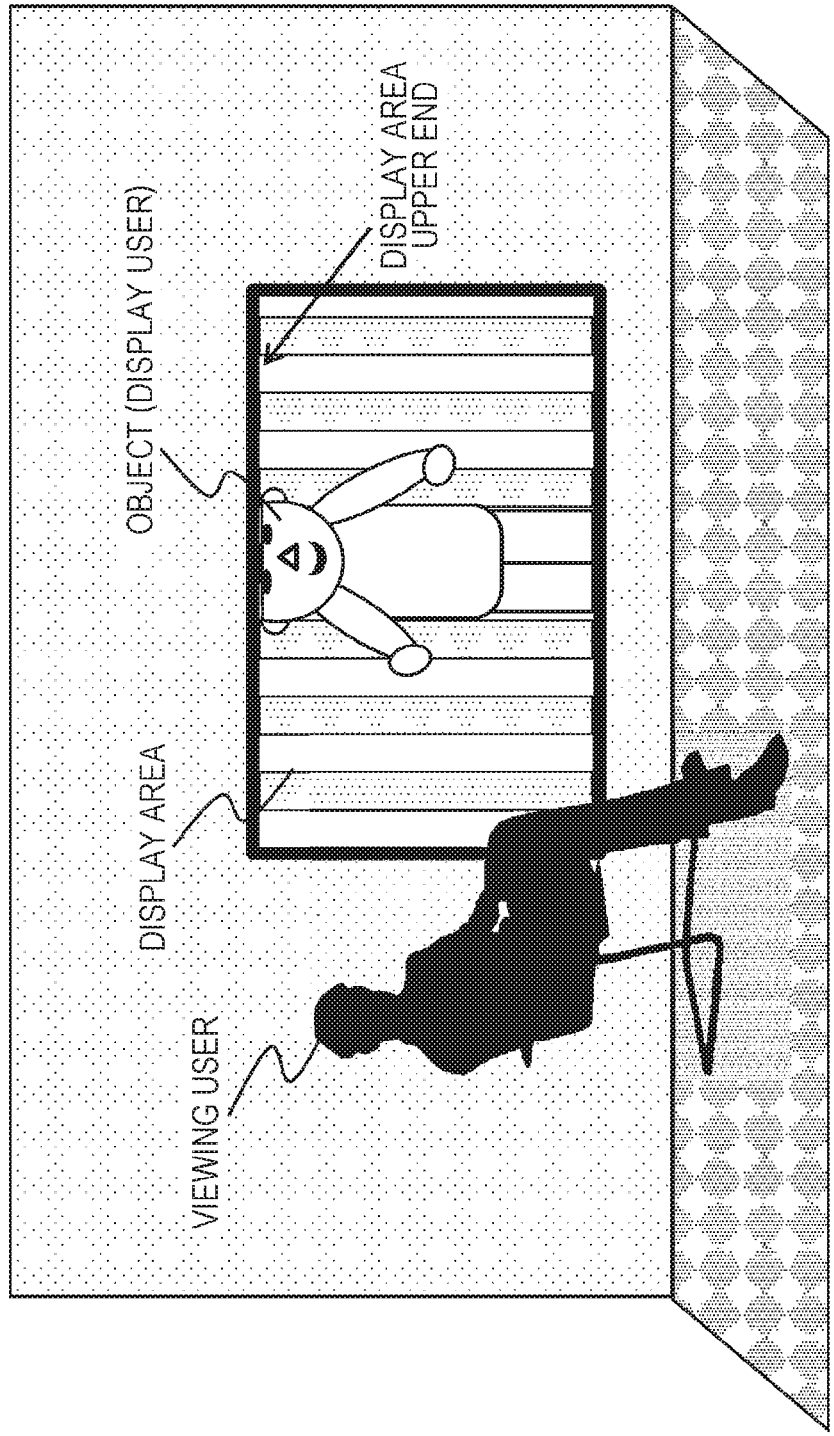

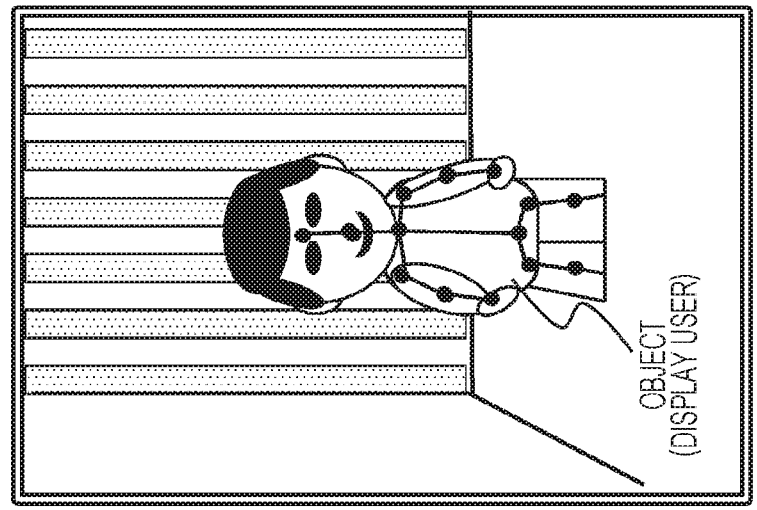
FIG. 15A EXAMPLE WITHOUT MISSING PART
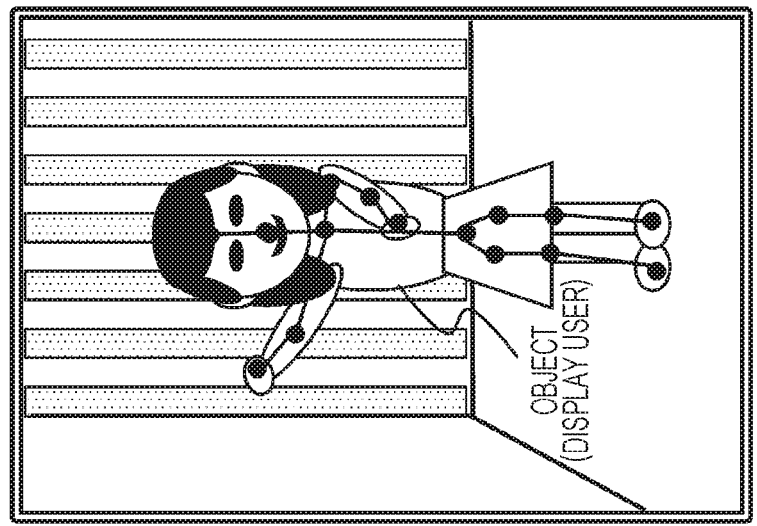
FIG. 15B EXAMPLE WITH MISSING PART

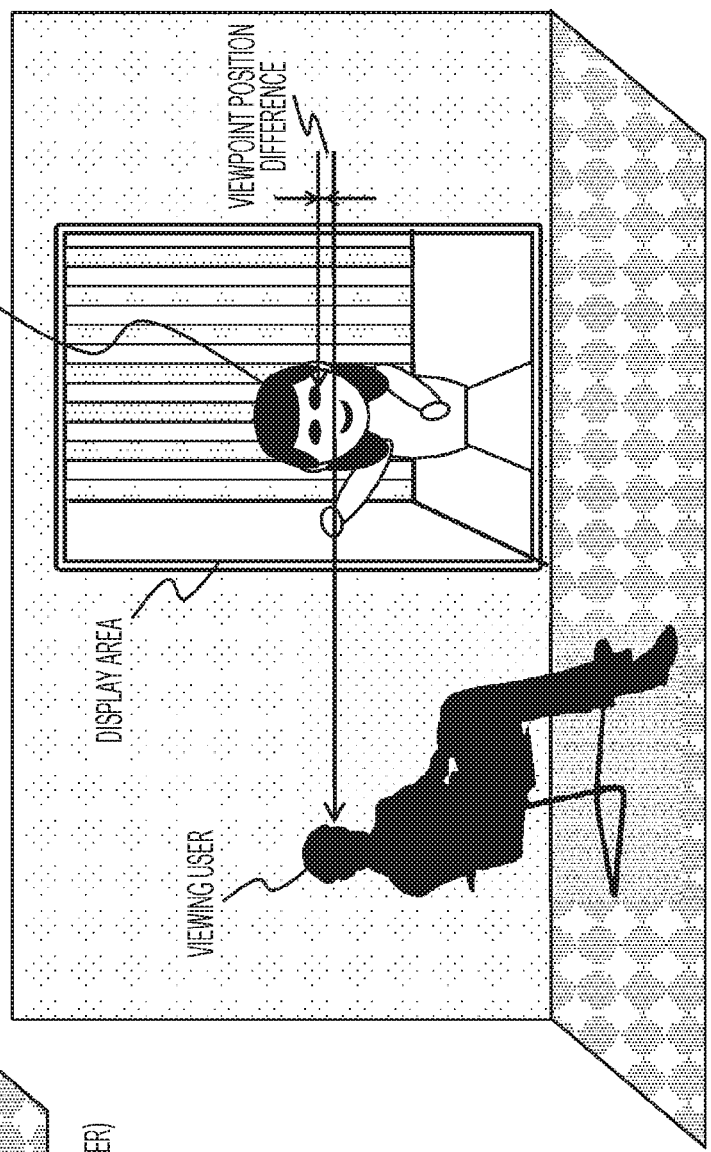

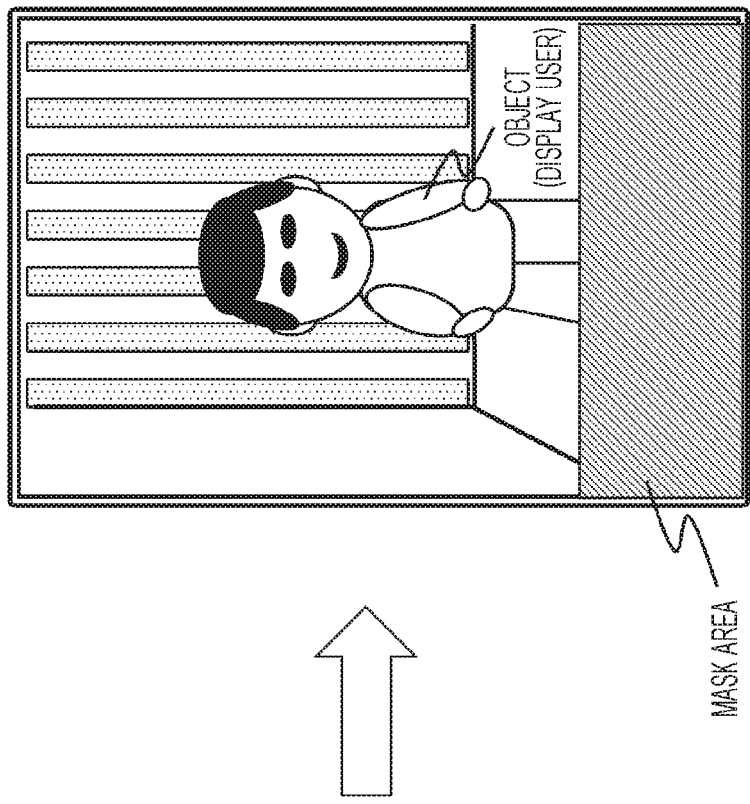
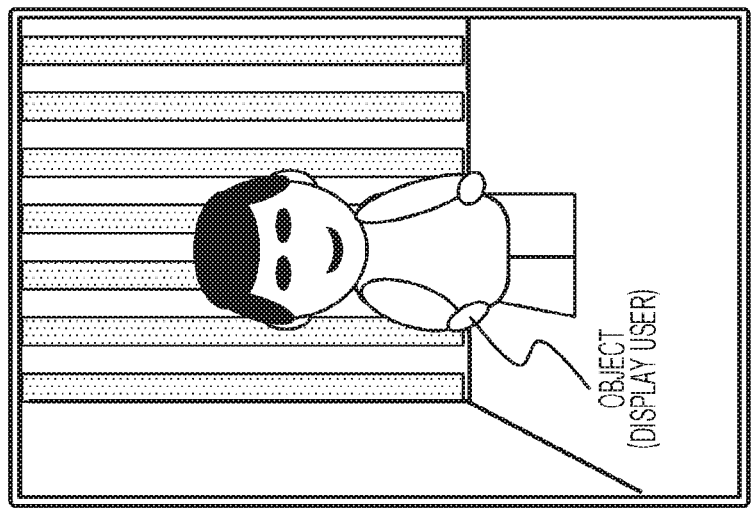

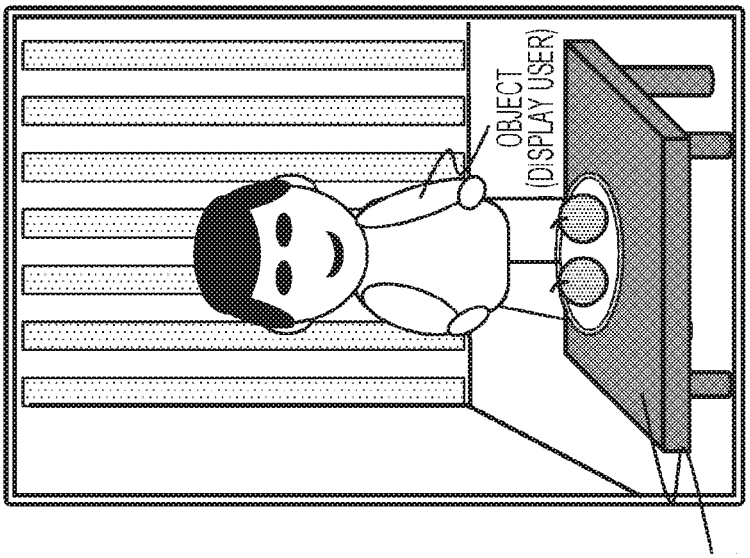
FIG. 24A OBJECT IMAGE WITH MISSING PART
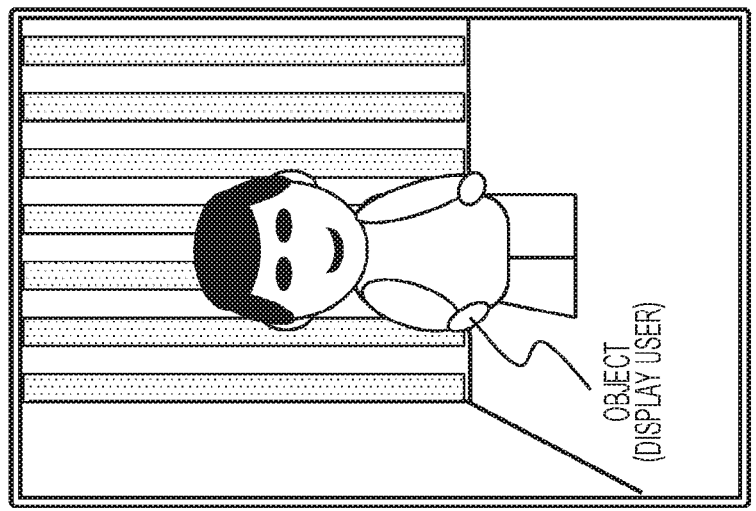
FIG. 24B OBJECT IMAGE WITH MASKED MISSING PART
DISPLAY IMAGE GENERATION EXAMPLE IN WHICH MISSING PART OF OBJECT (DISPLAY USER) IS HIDDEN–1
(EXAMPLE IN WHICH MASKING OBJECT IS ARRANGED IN FRONT OF MISSING PART)

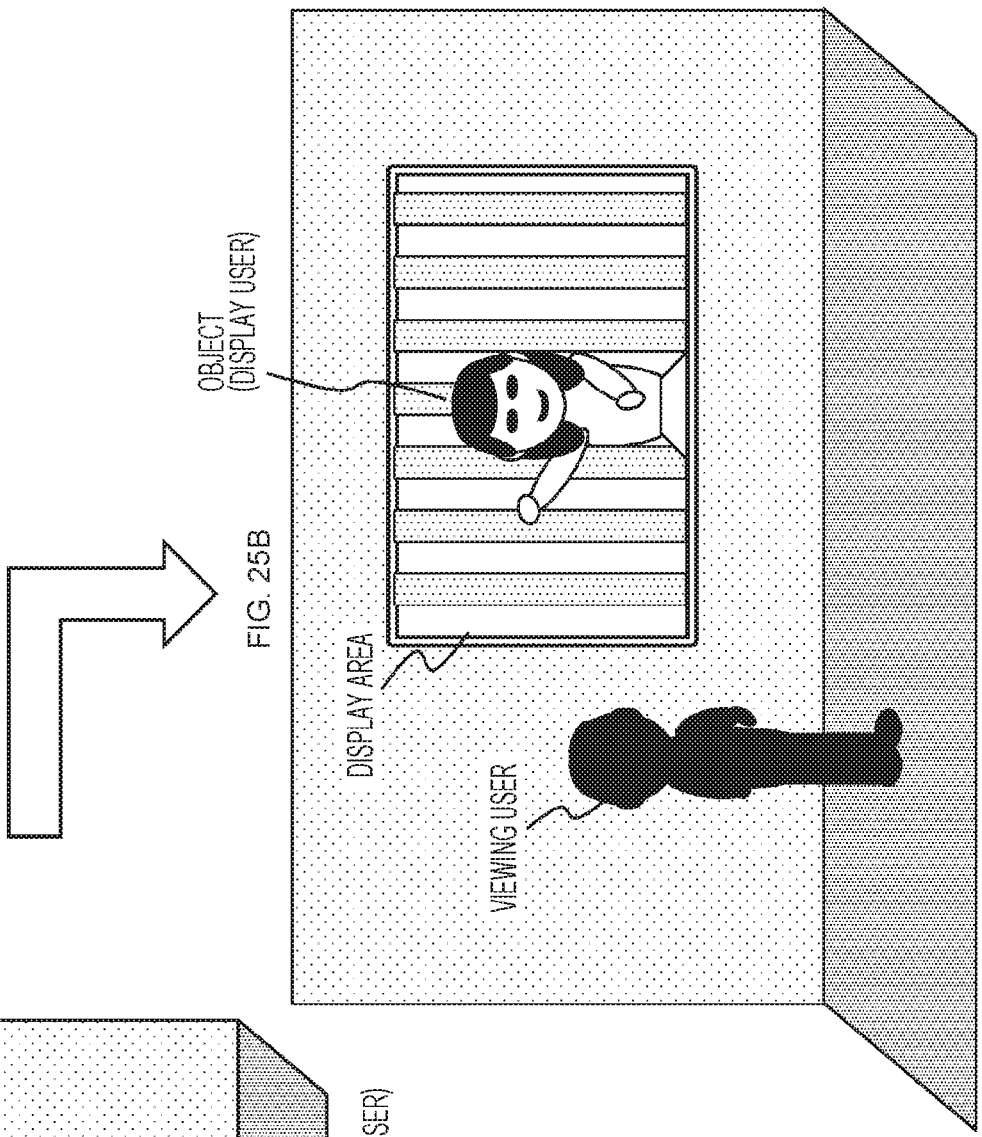

IMAGE PROCESSING APPARATUS, IMAGE PROCESSING SYSTEM, AND IMAGE PROCESSING METHOD

CROSS REFERENCE TO RELATED APPLICATIONS

This application is a U.S. National Phase of International Patent Application No. PCT/JP2017/014550 filed on Apr. 7, 2017, which claims priority benefit of Japanese Patent Application No. JP 2016-096697 filed in the Japan Patent Office on May 13, 2016. Each of the above-referenced applications is hereby incorporated herein by reference in its entirety.

TECHNICAL FIELD

The present disclosure relates to an image processing apparatus, an image processing system, and an image processing method, and a program. More specifically, for example, the present disclosure relates to an image processing apparatus, an image processing system, and an image processing method, and a program for transmitting images and sounds by way of communication via a network to execute communication.

BACKGROUND ART

Bidirectional communication systems such as video conference systems, which transmit and receive images and sounds by way of bidirectional communication via a network, are used in various fields.

In recent years, a large number of high definition large displays have been used. Further, the quality of images and sounds communicated via the network has been improved, and communication with remote users displayed on a display can be performed with a feeling as if the users were in the same conference room.

Furthermore, Patent Document 1 (Japanese Patent Application Laid-Open No. 2010-171695) discloses a system that enables conversation with realistic feeling by displaying a life-size user when displaying the user such as a person who performs communication on a display unit (display).

The system enables a user to have conversation with a feeling as if the communication partner displayed on the display unit was on the spot by displaying the person displayed on the display unit in actual size.

However, although the technology described in Patent Document 1 performs the life-size display, the technology does not take account of the shape of the display unit (display), the place where the display is placed, and the position of a gaze of a viewer who is viewing the display unit, for example.

For example, when the same user image is displayed on a display placed on a table and on a display placed on a floor, positions of the face of the display user are greatly different.

Further, positions of the eyes of the viewing user are greatly different between the case where the viewing user is standing and the case where the viewing user is sitting.

As described above, the case where the height of the gaze of the viewing user and the height of the gaze of the display user are greatly different occurs if the height of the display unit, the position of the eyes of the viewing user, and the like are not taken into account. As a result, for example, the viewing user has to look up and see the face of the display user to have conversation, and a problem that smooth communication cannot be executed, or the like occurs.

CITATION LIST

Patent Document

Patent Document 1: Japanese Patent Application Laid-Open No. 2010-171695

SUMMARY OF THE INVENTION

Problems to be Solved by the Invention

The present disclosure has been made in view of the above-described problems, for example, and an objective is to provide an image processing apparatus, an image processing system, and an image processing method, and a program, for controlling a display mode of an object in consideration of display unit information such as the size of the display unit (display) and the height of a placing location, information of a display object (display user), and viewer information such as a viewer's gaze position, to enable natural display of the object with a reduced feeling of strangeness, in the case of displaying the object on the display unit used in a communication system via a communication network, for example.

Solutions to Problems

A first aspect of the present disclosure is
an image processing apparatus including:
a display area information acquisition unit configured to acquire display area information of a display unit;
an image acquisition unit configured to acquire an input image including an object to be displayed on the display unit;
an image information analysis unit configured to analyze the input image;
a display mode determination unit configured to determine a display mode of the object to be displayed on the display unit, applying an analysis result of the image information analysis unit; and
an output image generation unit configured to generate an output image to be displayed on the display unit according to the display mode determined by the display mode determination unit.

Further, a second aspect of the present disclosure is
an image processing system that executes image reception/transmission between a first image processing apparatus and a second image processing apparatus connected by a network,
the first image processing apparatus including:
a display area information acquisition unit configured to acquire display area information of a display unit;
a communication unit configured to receive an input image including an object to be displayed on the display unit from the second image processing apparatus;
an image information analysis unit configured to analyze the input image;
a display mode determination unit configured to determine a display mode of the object to be displayed on the display unit, applying an analysis result of the image information analysis unit; and
an output image generation unit configured to generate an output image to be displayed on the display unit according to the display mode determined by the display mode determination unit.

Further, a third aspect of the present disclosure is
an image processing method executed in an image processing apparatus, the method including:

a display area information acquisition step of acquiring, by a display area information acquisition unit, a display area information of a display unit;

an image acquisition step of acquiring, by an image acquisition unit, an input image including an object to be displayed on the display unit;

an image information analysis step of analyzing, by an image information analysis unit, the input image;

a display mode determination step of determining, by a display mode determination unit, a display mode of the object to be displayed on the display unit, applying an analysis result of the image information analysis unit; and an output image generation step of generating, by an output image generation unit, an output image to be displayed on the display unit according to the display mode determined by the display mode determination unit.

Further, a fourth aspect of the present disclosure is
a program for causing an image processing apparatus to execute image processing including:

a display area information acquisition step of acquiring, by a display area information acquisition unit, a display area information of a display unit;

an image acquisition step of acquiring, by an image acquisition unit, an input image including an object to be displayed on the display unit;

an image information analysis step of analyzing, by an image information analysis unit, the input image;

a display mode determination step of determining, by a display mode determination unit, a display mode of the object to be displayed on the display unit, applying an analysis result of the image information analysis unit; and an output image generation step of generating, by an output image generation unit, an output image to be displayed on the display unit according to the display mode determined by the display mode determination unit.

Note that the program of the present disclosure is, for example, a program that can be provided by a storage medium or a communication medium provided in a computer readable format to an image processing apparatus or a computer system that can execute various program codes. By providing such a program in the computer readable format, processing according to the program is realized on the image processing apparatus or the computer system.

Still other objects, features, and advantages of the present disclosure will become clear from more detailed description based on embodiments and attached drawings of the present disclosure described below. Note that the system in the present specification is a logical aggregate configuration of a plurality of devices, and is not limited to devices having respective configurations within the same housing.

Effects of the Invention

According to the configuration of an embodiment of the present disclosure, for example, the configuration to make the object image to be displayed on the image processing apparatus that executes bidirectional communication be an optimum display image according to the types of information of the display unit, the object, the viewer, and the like is realized.

Specifically, the display area information acquisition unit acquires the display area information of the display unit, and the image acquisition unit acquires the input image including the object to be displayed on the display unit. Further, the image information analysis unit executes input image analysis processing, and the display mode determination unit determines the display mode of the object to be displayed on the display unit, applying an analysis result, and displays the output image generated according to the determined display mode on the display unit. Processing for the missing portion of the object in the case of performing the full-size display, correction of the line of sight position, and the like are executed, and natural display of the object is executed.

With the configuration, for example, the configuration to make the object image to be displayed on the image processing apparatus that executes bidirectional communication be an optimum display image according to the types of information of the display unit, the object, the viewer, and the like is realized.

Note that the effects described in the present specification are merely examples and are not limited, and additional effects may be exhibited.

BRIEF DESCRIPTION OF DRAWINGS

FIGS. 9A, 9B, and 9C are diagrams for describing body part detection examples.

FIG. 10 is a diagram for describing an object body height measurement example.

FIG. 13 is a diagram for describing comparison processing between a display area upper end and an object body height.

FIG. 14 is a diagram for describing comparison processing between a display area upper end and an object body height.

FIGS. 15A and 15B are diagrams for describing a missing part of an object.

FIGS. 21A and 21B are diagrams for describing a display example of an image in which viewpoint positions of an object and a viewing user are brought close to each other.

FIGS. 23A and 23B are diagrams for describing a display example of an image in which a missing part of an object is hidden.

FIGS. 24A and 24B are diagrams for describing a display example of an image in which a missing part of an object is hidden.

FIGS. 25A and 25B are diagrams for describing a display example of an image giving priority to a composition.

MODE FOR CARRYING OUT THE INVENTION

Hereinafter, an image processing apparatus, an image processing system, and an image processing method, and a program of the present disclosure will be described in detail with reference to the drawings. Note that the description will be given according to the following items.

1. Outline of bidirectional communication processing
2. Hardware configuration example of image processing apparatus
3. Functional configuration example of image processing apparatus
4. Processing sequence executed by image processing apparatus and specific display example
5. Conclusion of configuration of present disclosure

1. Outline of Bidirectional Communication Processing

First, an outline of bidirectional communication processing will be described.

Figure 1:
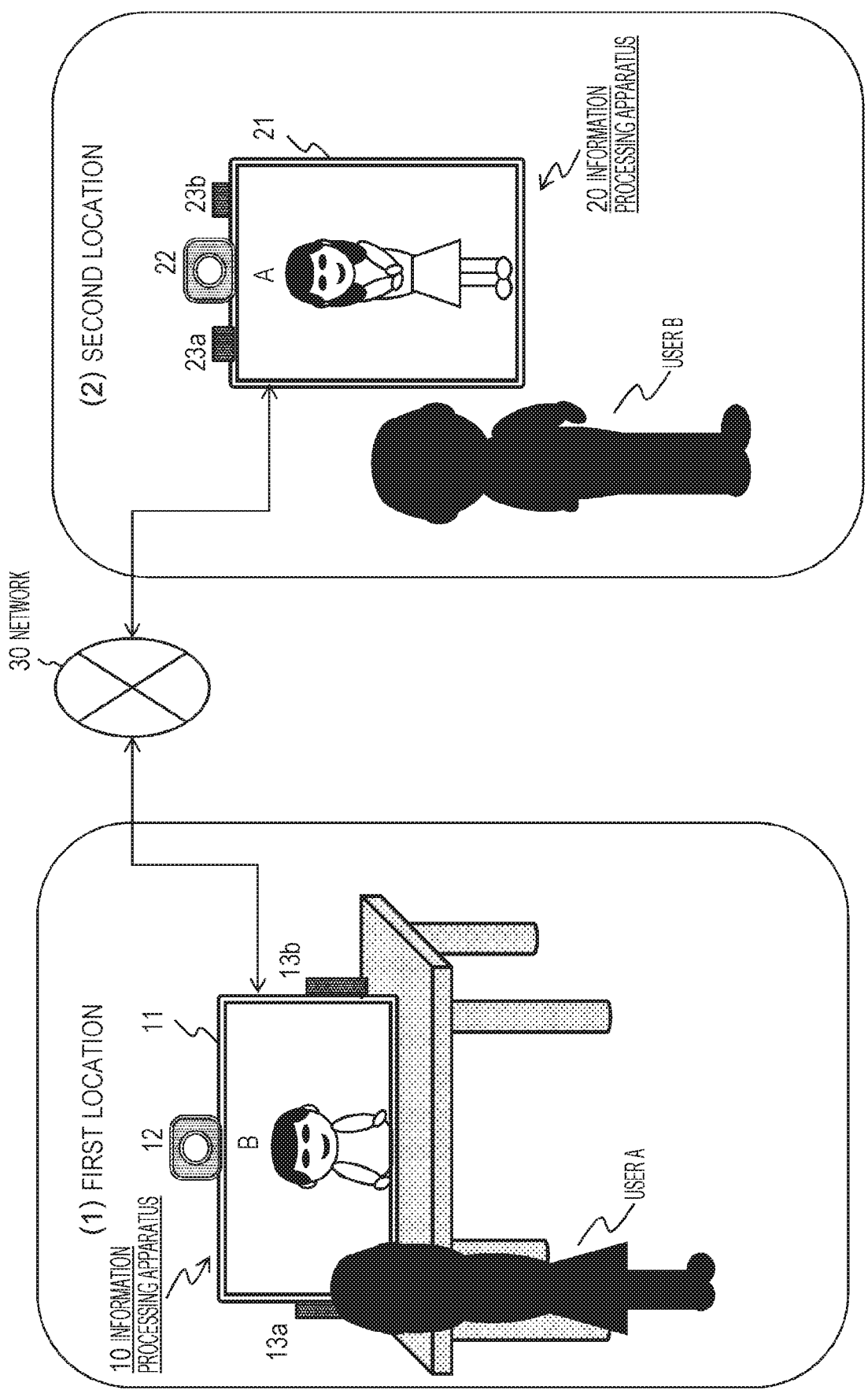
FIG. 1 is a diagram for describing a bidirectional communication system.

FIG. 1 is a diagram illustrating an example of a bidirectional communication system.

FIG. 1 illustrates a configuration example of two locations:

(1) a first location; and
(2) a second location.

These two locations are located at distant remote locations from each other, and users in the respective locations perform bidirectional communication. Systems at respective locations are connected via a network 30.

A user A is at the first location.

Further, an image processing apparatus 10 including a display unit (display) 11, a camera 12, and audio input/output units (microphones and speakers) 13a and 13b is at the first location.

Meanwhile, a user B is at the second location.

Further, an image processing apparatus 20 including a display unit (display) 21, a camera 22, and audio input/output units (microphones and speakers) 23a and 23b is at the second location.

The camera 12 at the first location captures the user A at the first location and transmits an image to the image processing apparatus 20 at the second location via the network 30.

The image processing apparatus 20 at the second location displays, on the display unit 21, the image of the user A transmitted from the image processing apparatus 10 at the first location.

In this display processing, the image processing apparatus 20 performs full-size (life-size) display of the user A that is a display user.

In this full-size display processing, the image processing apparatus 20 executes display control in consideration of the size of the display unit 21, the height at which the display unit 21 is placed, a displayable part of the display user (a part of an object image included in the captured image), and a difference in viewpoint position (height of gaze) between the display user and the viewing user (user B), and the like.

Note that the audio input/output units (microphones and speakers) 13a and 13b at the first location acquire audio of utterance and the like of the user A at the first location, and acquired audio data is transmitted to the image processing apparatus 20 at the second location via the network 30.

The image processing apparatus 20 at the second location outputs received audio from the first location via the audio input/output units (microphones and speakers) 23a and 23b.

Meanwhile, the camera 22a at the second location captures the user B at the second location, and transmits an image to the image processing apparatus 10 at the first location via the network 30.

The image processing apparatus 10 at the first location displays, on the display unit 11, the image of the user B transmitted from the image processing apparatus 20 at the second location.

In this display processing, the image processing apparatus 10 performs full-size (life-size) display of the user B that is a display user.

In this full-size display processing, the image processing apparatus 10 executes display control in consideration of the size of the display unit 11, the height at which the display unit 11 is placed, a displayable part of the display user (a part of an object image included in the captured image), and a difference in viewpoint position (height of gaze) between the display user and the viewing user (user A), and the like.

Note that the audio input/output units (microphones and speakers) 23a and 23b at the second location acquire audio of utterance and the like of the user B at the second location, and acquired audio data is transmitted to the image processing apparatus 10 at the first location via the network 30.

The image processing apparatus 10 at the first location outputs received audio from the second location via the audio input/output units (microphones and speakers) 13a and 13b.

With such processing, the user A at the first location and the user B at the second location can acquire the image and utterance of the user at the remote location via the display unit and the speaker to perform bidirectional communication.

Such bidirectional communication processing enables communication with realistic feeling as if the communication partner was on the spot by using the full-size image and performing the display control according to the line of sight position of the viewing user, and the like, as the display image of the user displayed on the display unit 11 or 21.

2. Hardware Configuration Example of Image Processing Apparatus

Next, a hardware configuration example of the image processing apparatus 10 and the image processing apparatus 20 illustrated in FIG. 1 will be described with reference to FIG. 2.

Figure 2:
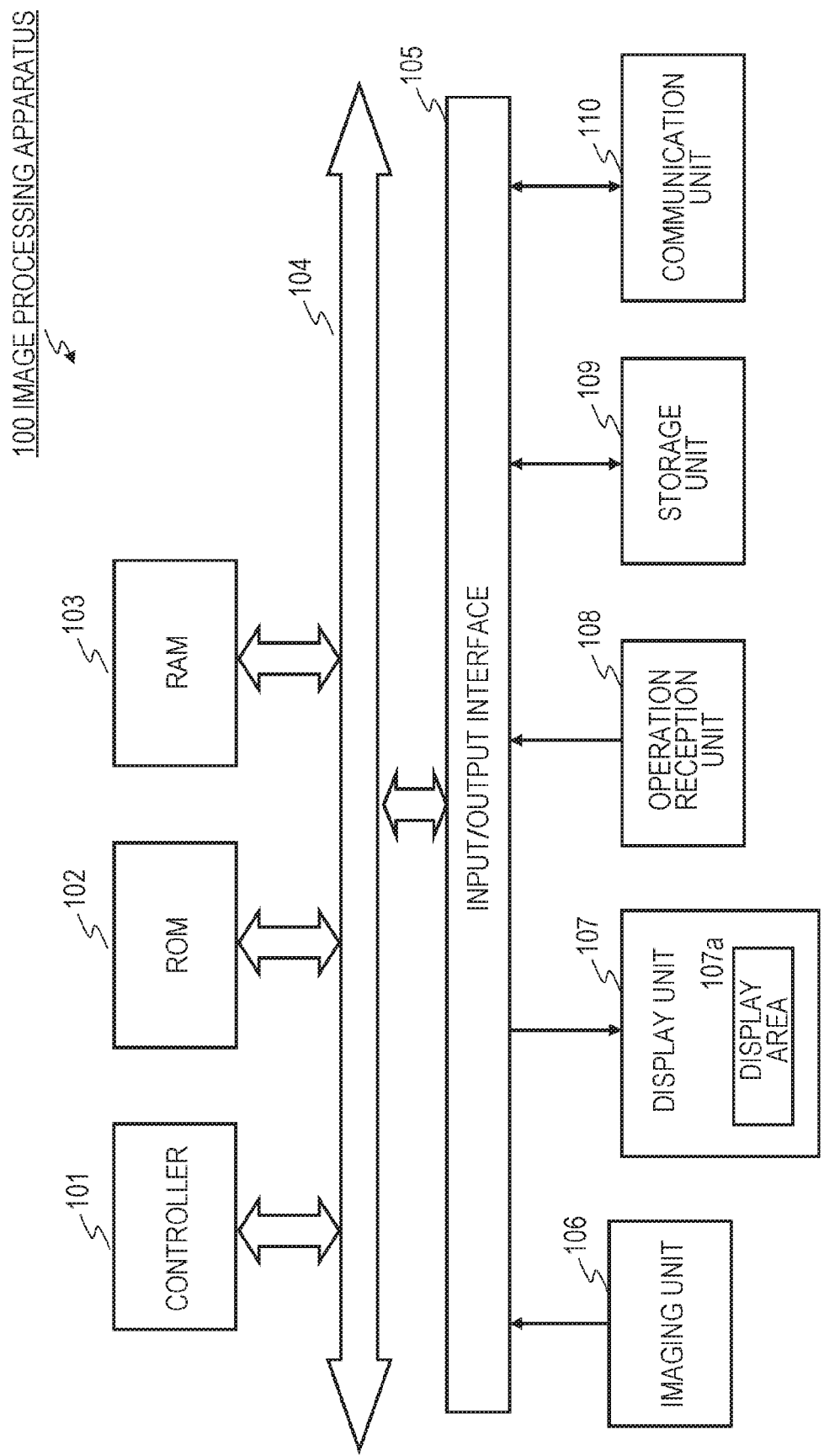
FIG. 2 is a diagram for describing a hardware configuration example of an image processing apparatus.

FIG. 2 illustrates a hardware configuration example of an image processing apparatus 100 corresponding to the image processing apparatus 10 or the image processing apparatus 20 illustrated in FIG. 1.

The image processing apparatus 100 can be configured as an information processing apparatus in the present embodiment. Specifically, the image processing apparatus 100 may be an information processing apparatus such as a personal computer (PC), a tablet PC, a smartphone, a tablet terminal, a game machine, a projector, a portable projector, or the like.

In FIG. 2, the image processing apparatus 100 includes a controller 101, a read only memory (ROM) 102, a random access memory (RAM) 103, an input/output interface 105, and a bus 104 that connects the aforementioned elements to each other.

The controller 101 appropriately accesses the RAM 103 and the like as needed, and integrally controls the entire blocks of the image processing apparatus 100 while performing various arithmetic operations. The controller 101 may be a central processing unit (CPU), a graphics processing unit (GPU), or the like. The ROM 102 is a nonvolatile memory in which firmware such as an OS, programs, and various parameters to be executed by the controller 101 is fixedly stored. The RAM 103 is used as a work area or the like of the controller 101, and temporarily holds the OS, various applications in execution, and various data in processing.

An imaging unit 106, a display unit (display) 107, an operation reception unit 108, a storage unit 109, a communication unit 110, and the like are connected to the input/output interface 105. Note that the input/output interface 105 may be configured connectable to an external peripheral device via a universal serial bus (USB) terminal, an IEEE terminal, or the like, in addition to each of the aforementioned elements. Further, an imaging unit (not illustrated) or the like may be connected to the input/output interface 105, in addition to each of the aforementioned elements.

The imaging unit 106 is, for example, a camera that captures an object that executes bidirectional communication, such as the user A or the user B illustrated in FIG. 1, and is configured by a video camera, for example.

The captured image by the imaging unit 106 is also used as information for analyzing the position and size of a display area 107a of the display unit 107 on the imaging unit 106 side.

The display unit (display) 107 is a display device using, for example, a liquid crystal display (LCD), an organic light emitting diode (OLED), a cathode ray tube (CRT), a projector, or the like. Note that the display area 107a on which an image is displayed is demarcated on the display unit (display) 107.

The operation reception unit 108 is, for example, a pointing device such as a mouse, a keyboard, a touch panel, and other input devices. In the case where the operation reception unit 108 is a touch panel, the touch panel may be integrated with the display unit (display) 107.

The storage unit 109 is, for example, a nonvolatile memory such as a hard disk drive (HDD), a flash memory (solid state drive (SSD)), or another solid-state memory. The storage unit 109 stores the OS, various applications, and various data. The storage unit 109 is also used as a storage area for an input image, image information, a generated output image group, and the like to be described below.

The communication unit 110 is, for example, a network interface card (NIC) for Ethernet (registered trademark), and is responsible for communication processing via a network.

The image processing apparatus 100 having the above hardware configuration has the following functional configurations.

3. Functional Configuration Example of Image Processing Apparatus

Next, a functional configuration example of the image processing apparatus 100 will be described with reference to FIG. 3.

Figure 3:
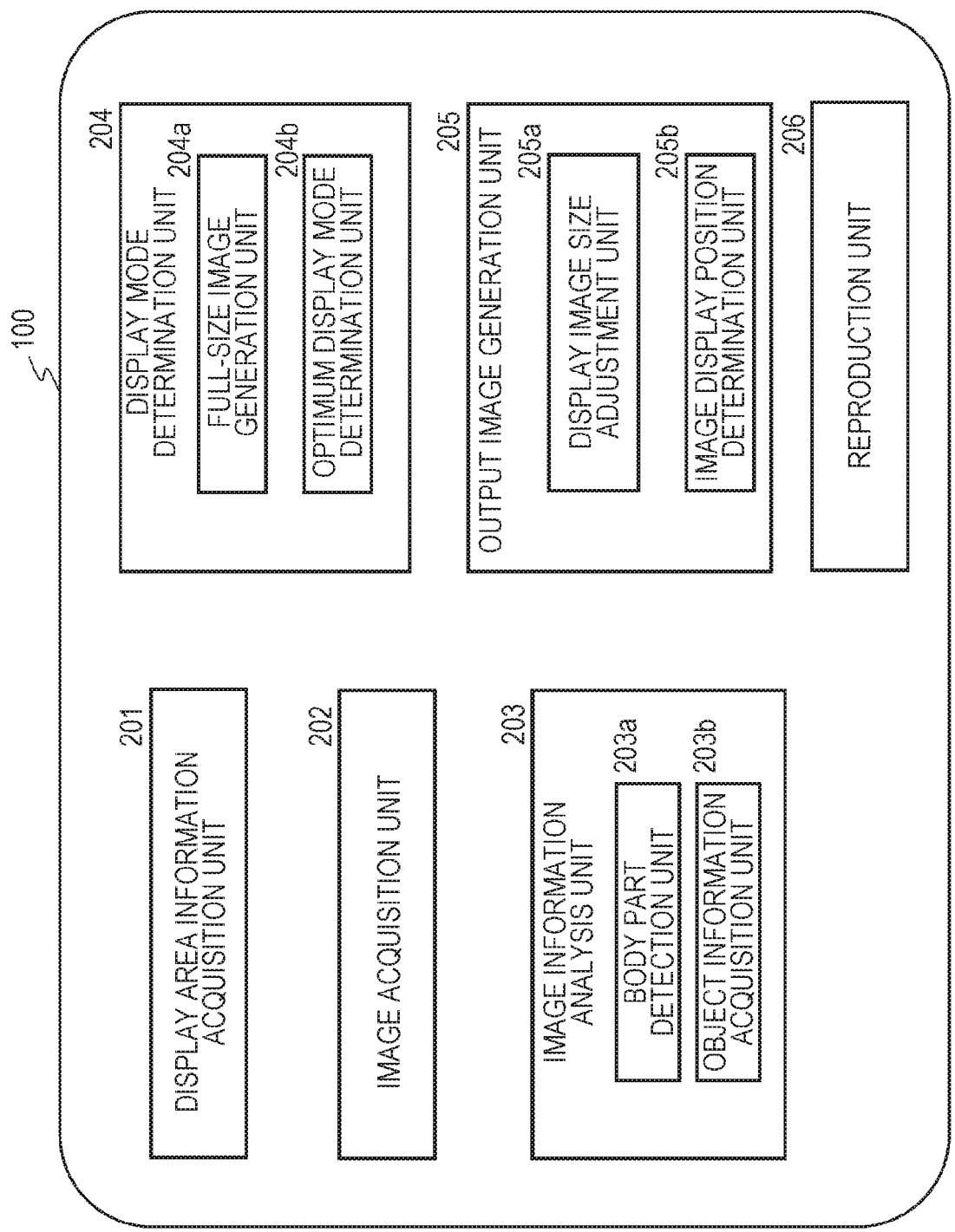
FIG. 3 is a diagram for describing a functional configuration of the image processing apparatus.

FIG. 3 is a block diagram illustrating functional configurations of the image processing apparatus 100. As illustrated in FIG. 3, the image processing apparatus 100 includes a display area information acquisition unit 201, an image acquisition unit 202, an image information analysis unit 203, a display mode determination unit 204, an output image generation unit 205, a reproduction unit 206.

The display area information acquisition unit 201 acquires specifications of the display area 107a (a screen of the display/a projection surface of the projector) of the display unit 107 of the image processing apparatus 100 illustrated in FIG. 2, for example, vertical and horizontal sizes of the display area 107a, a resolution, a pixel pitch (the number of pixels), a height from a floor or a ground of a space where the display area 107a is present to a lower end of the display area.

A specific example of the display area information acquired by the display area information acquisition unit 201 will be described with reference to FIG. 4.

Figure 4:
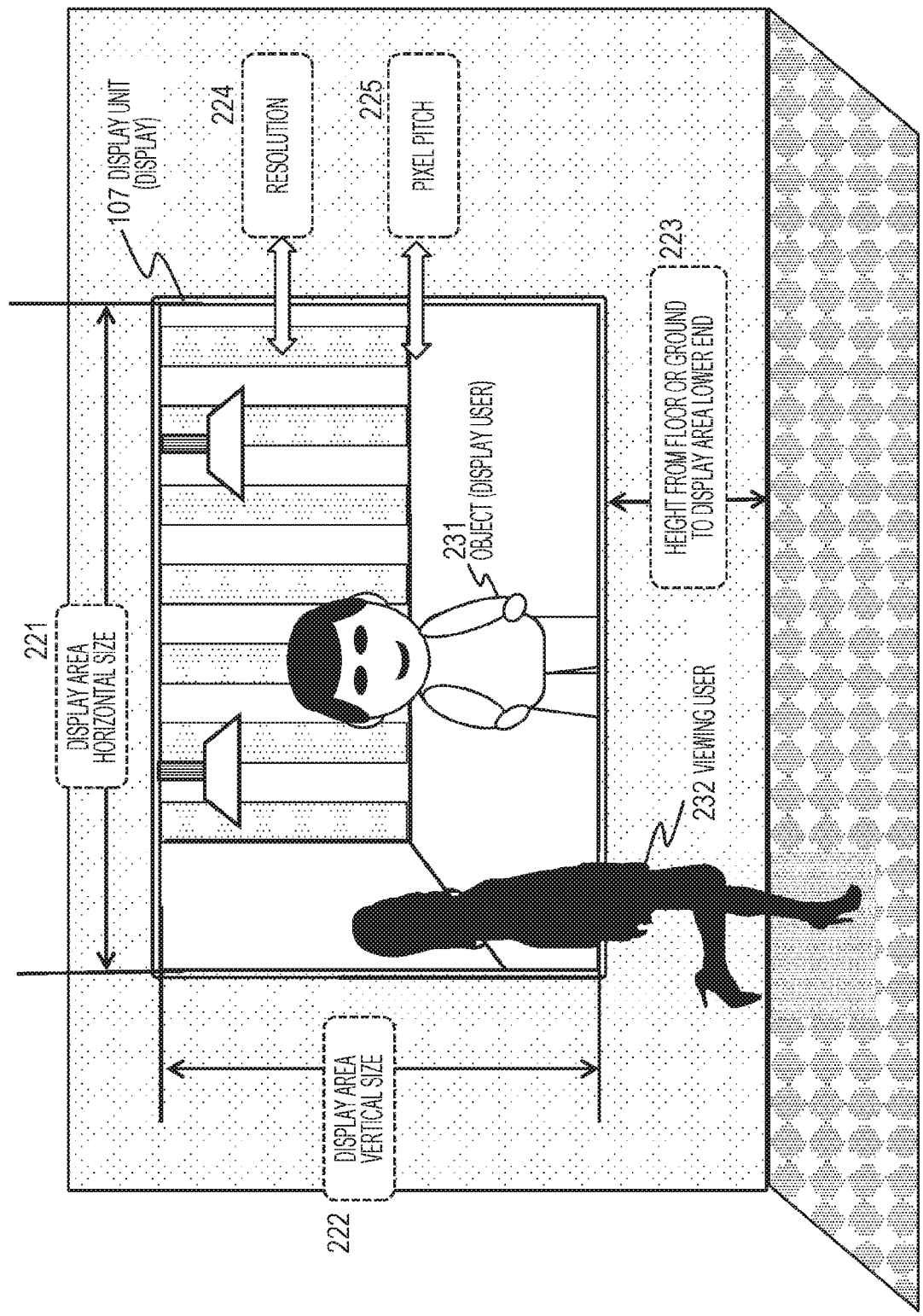
FIG. 4 is a diagram for describing display area information.

The display area information acquisition unit 201 acquires the following information of the display unit 107 as illustrated in FIG. 4:

(a) a display area horizontal size 221;
(b) a display area vertical size 222;
(c) a height 223 from the floor or the ground to the lower end of the display area;
(d) a resolution 224; and
(e) a pixel pitch 225.

Note that, if these specifications are recorded in the memory or the like attached to the storage unit 109 or the display unit 107, these pieces of information may be acquired therefrom. In the case where these pieces of information are not recorded, the specifications of the display area 107a may be acquired using a captured image of the display area 107a by the capturing unit 106.

The image acquisition unit 202 acquires an input image (display image) to be processed. The input image at this time may be an image recorded in the storage unit 109, an image captured by the capturing unit 106, or a video transmitted from a remote location via the communication unit 110. Further, the input image may be an image in which only an object person is cut out.

The image information analysis unit 203 includes a body part detection unit 203a and an object information acquisition unit 203b, and analyzes information of the input image including information of the object. The body part detection unit 203a detects a body part of the object person from the input image.

Figure 5:
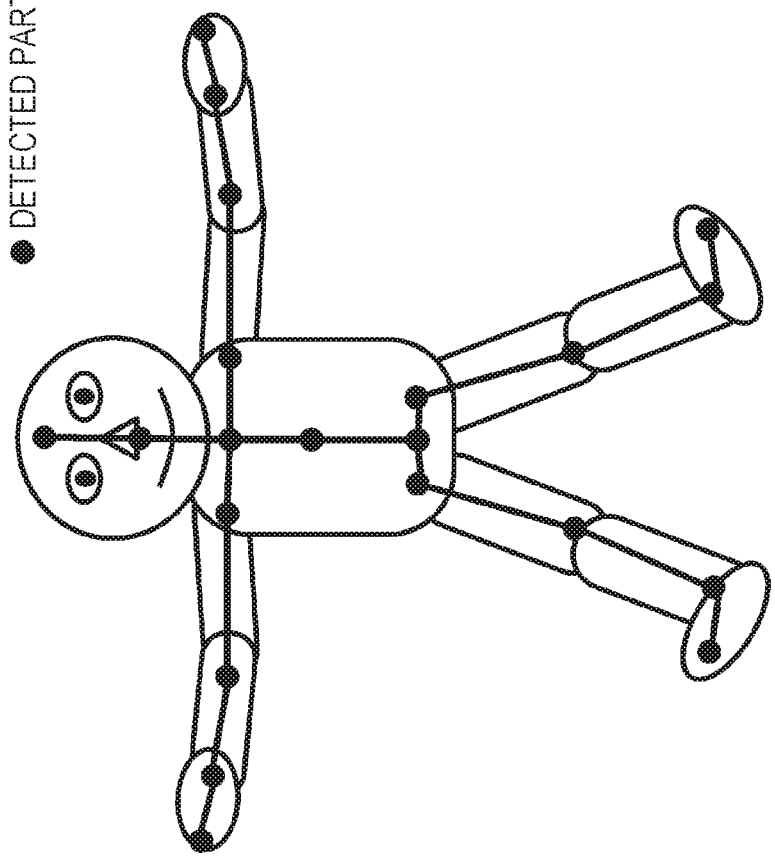
FIG. 5 is a diagram for describing an example of body part detection.

For example, as illustrated in FIG. 5, body parts such as a head, left and right ankles, and the like are detected.

The body part detection is executed by applying an image analysis of a human body that is the display user (object) included in the input image (display image), a so-called motion capture technology.

The body part detection unit 203a identifies each part constituting the human body as the object included in the captured image, such as the head, hands, and feet of the human body, joints of elbows, shoulders, and knees, or the like, for example.

The object information acquisition unit 203b analyzes a real size (body height) and the like of the object, using the analysis technology about detection of an area of the object included in the input image (display image), detection of the floor or the ground of the space where the object is present, or an actual size of the object.

Note that the body part detection unit 203a and the object information acquisition unit 203b may acquire the body part detection result and the object information from metadata recorded in the input image.

The display mode determination unit 204 includes a full-size image generation unit 204a and an optimum display mode determination unit 204b.

The full-size image generation unit 204a generates an image for displaying the object in full size.

For example, the full-size image generation unit 204a enlarges or reduces the input image so that the object is displayed in full size in the display area 107a to generate image data for displaying the object in full size on the basis of the specifications of the display area 107a acquired by the display area information acquisition unit 201 and the information of the input image.

The optimum display mode determination unit 204b executes a predefined optimum display mode determination algorithm, applying the specifications of the display area 107a acquired by the display area specification acquisition unit 201 and the object information analyzed in the image information analysis unit 203, to determine an optimum display mode. Specifically, for example, the following determination processing is executed:

(a) determination processing as to whether or not an upper end of the display area is higher than the body height of the object person to be displayed;

(b) determination processing as to whether or not there is a missing area that cannot be displayed on the display unit by full-size display of the object person to be displayed;

(c) determination processing as to whether or not an object image to be displayed includes the head, and a missing part other than the head is at a predefined threshold ratio or less; and (d) determination processing as to whether or not a difference between a viewpoint position of the object person to be displayed and the viewpoint position of the viewing user is a predefined threshold or less.

The optimum display mode determination unit 204b executes an optimum display mode determination algorithm including the determination processing (a) to (d), for example, to determine the optimal display mode. Specifically, the optimum display mode determination unit 204b determines a size and a display position of an optimum display image, necessity of mask processing, and the like.

Note that a specific processing sequence will be described below with reference to the flowchart.

The output image generation unit 205 includes a display image size adjustment unit 205a and an image display position determination unit 205b.

The display image size adjustment unit 205a executes size adjustment of the display image for displaying an optimum display image determined by the optimum display mode determination unit 204b.

In the case where the optimum display image determined in the optimum display mode determination unit 204b is a full size, the display image size adjustment unit 205a uses the image generated by the full-size image generation unit 204a.

Further, in the case where the optimum display image determined in the optimum display mode determination unit 204b is not the full size, the display image size adjustment unit 205a executes reduction, enlargement, or the like of the image generated by the full-size image generation unit 204a to generate a display image having an image size adapted to the optimum display image determined in the optimum display mode determination unit 204b.

The display position determination unit 205b determines the display position of the display image for displaying the optimum display image determined by the optimum display mode determination unit 204b.

The output image generation unit 205 generates the output image according to the determined display image size, display position, and the like. In the case where the input image is an image in which only the object person is cut out, for example, the output image may be generated by superimposing the input image as a foreground image on a planar still image, a moving image, or a 3D model image as a background image.

Figure 6:
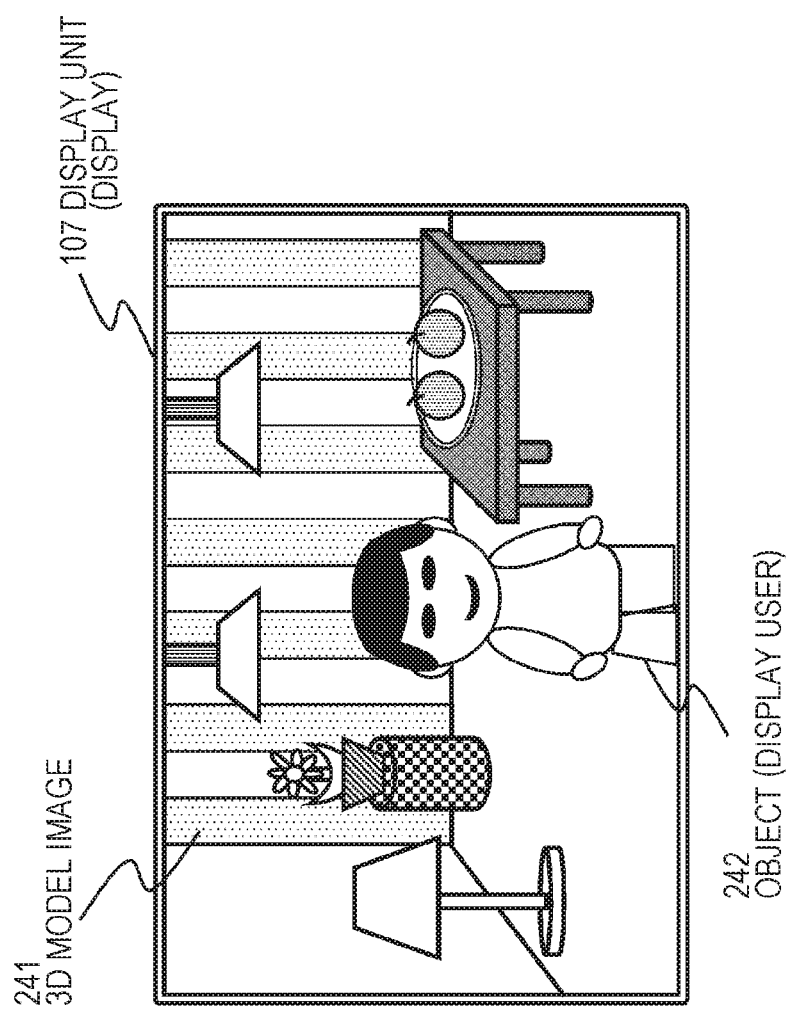
FIG. 6 is a diagram for describing an example of an image in which an object image is superimposed and displayed on a 3D model background image.

FIG. 6 is a diagram illustrating an example in which a 3D model image 241 is displayed on the display unit 107 as the background, and a planar object (display user) 242 is superimposed and displayed on the 3D mode image 241.

The reproduction unit 206 reproduces, for example, an output image as illustrated in FIG. 6. The reproduction unit 207 is realized by the display unit 107, for example.

4. Processing Sequence Executed by Image Processing Apparatus and Specific Display Example Next, a processing sequence executed by an image processing apparatus and a specific display example will be described.

Figure 7:
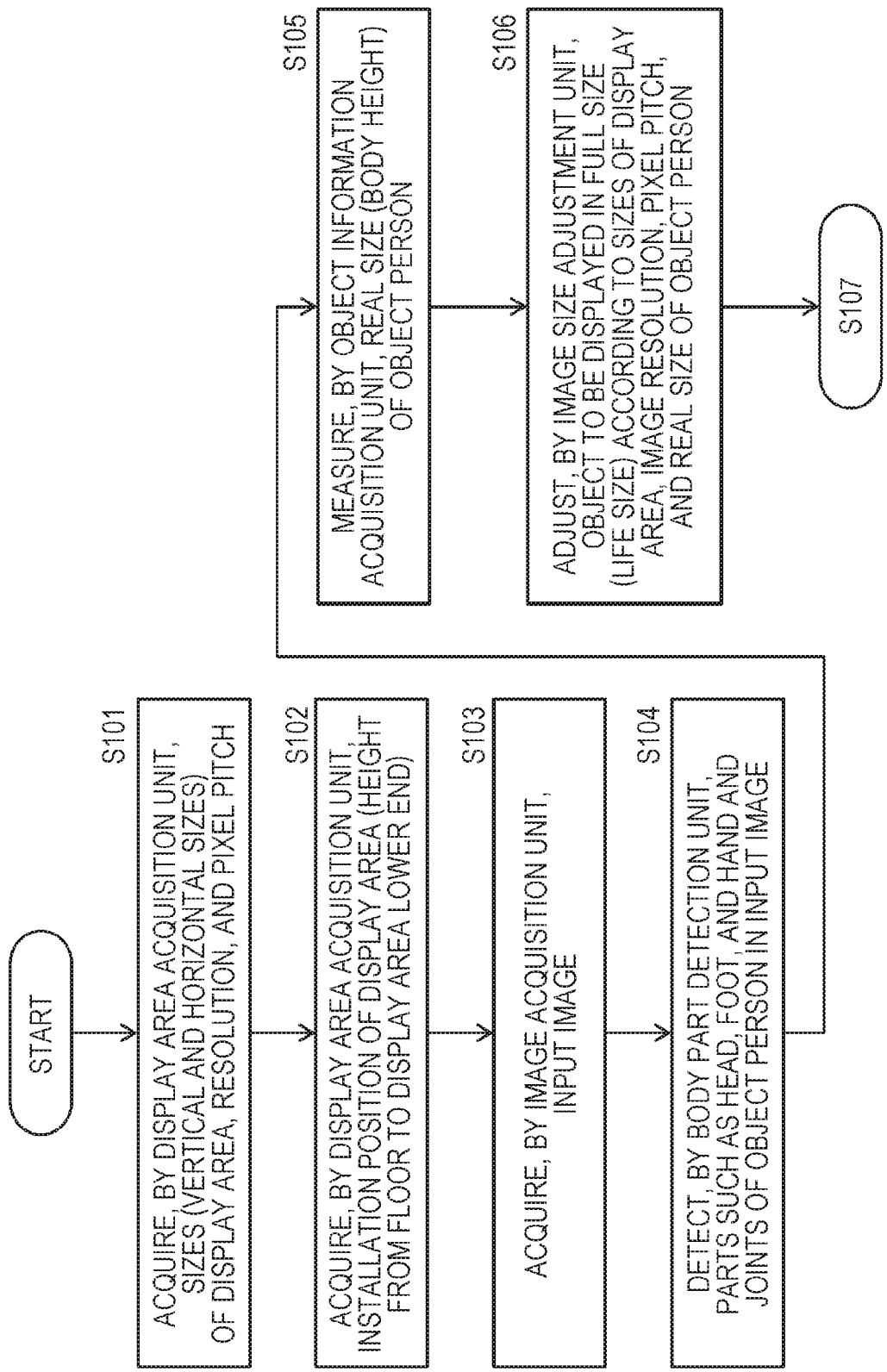
FIG. 7 is a diagram illustrating a flowchart for describing a processing sequence executed by the image processing apparatus.
Figure 8:
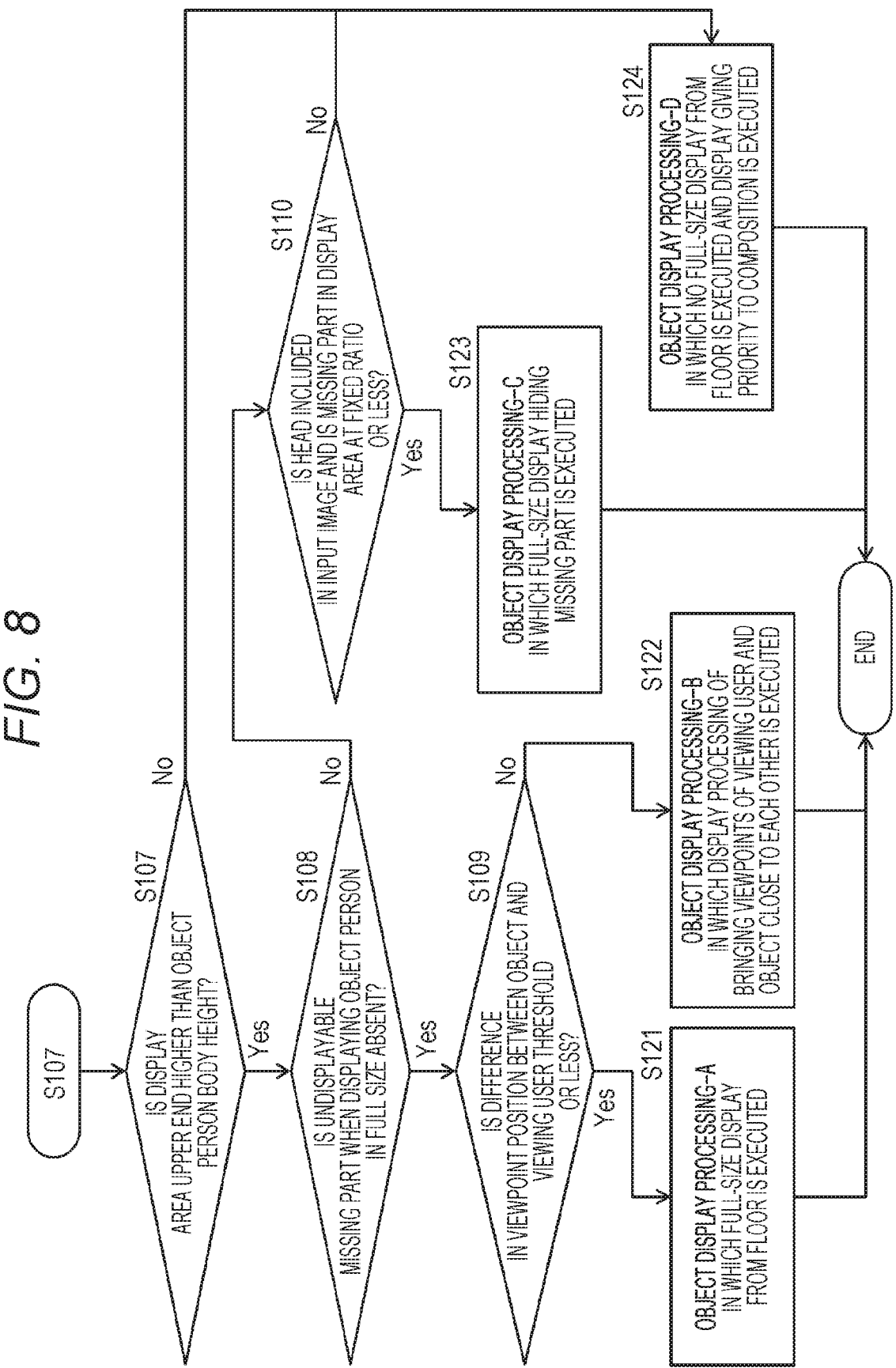
FIG. 8 is a diagram illustrating a flowchart for describing a processing sequence executed by the image processing apparatus.

FIGS. 7 and 8 illustrate flowcharts for describing the processing sequence of the image processing apparatus 100.

Note that the processing according to the flowcharts illustrated in FIGS. 7 and 8 is executed under control of a data processing unit of a controller including a CPU and the like having a program execution function according to a program stored in the storage unit of the image processing apparatus, for example.

The processing of each step of the flowchart in FIG. 7 and the subsequent drawing will be sequentially described.

(Steps S101 and S102)

First, in steps S101 to 102, the display area information acquisition unit 201 of the image processing apparatus acquires the information of the display area 107a of the display unit 107.

This is the processing described with reference to FIG. 4, and the display area information acquisition unit 201 acquires the following information of the display unit 107 as illustrated in FIG. 4:

(a) the display area horizontal size 221;

(b) the display area vertical size 222;

(c) the height 223 from the floor or the ground to the lower end of the display area;

(d) the resolution 224; and (e) the pixel pitch 225.

Note that, if these specifications are recorded in the memory or the like attached to the storage unit 109 or the display unit 107, these pieces of information may be acquired therefrom. In the case where these pieces of information are not recorded, the specifications of the display area 107a may be acquired using a captured image of the display area 107a by the capturing unit 106.

(Step S103)

Next, in step S103, the image acquisition unit 102 acquires the input image (display image) to be displayed in the display area 107a of the display unit 107.

Note that the processing order of steps S101 to S103 is not particularly limited.

Further, in the case of using the display area 107 physically installed and fixed on a wall such as a display, the display area information acquisition processing in steps S101 and S102 above needs to be performed once before the start of the display processing.

However, for example, in the case where the display area 107a such as a portable projector is moved, in the case where the vertical side and horizontal side of the display area are swapped, in the case where the height from the floor or the ground to the lower end of the display area may be changed, or the like, the display area information acquisition processing in step S101 and S102 needs to be periodically executed as needed.

(Step S104)

Next, in step S104, the body part detection unit 203a of the image information analysis unit 203 detects parts such as the head and ankle of the object person in the input image (display image).

This processing is the processing described with reference to FIG. 5.

The body part detection unit 203a of the image information analysis unit 203 detects the body parts of the object person from the input image. For example, as illustrated in FIG. 5, body parts such as the head, left and right ankles, and the like are detected. The body part detection is executed by applying an image analysis of a human body that is the display user (object) included in the input image (display image), a so-called motion capture technology.

The body part detection unit 203a identifies each part constituting the human body as the object included in the captured image, such as the head, hands, and feet of the human body, joints of elbows, shoulders, and knees, or the like, for example.

FIGS. 9A, 9B, and 9C illustrate specific body part detection processing examples for the object in the input image (display image).

FIGS. 9A, 9B, and 9C illustrate the following three body part detection examples:

FIG. 9A body part detection example 1;
FIG. 9B body part detection example 2; and
FIG. 9C body part detection example 3.

(1) The body part detection example 1 is a body part detection example of a case where the object image of the upper body from above the knee is input as the input image.

(2) The body part detection example 2 is a body part detection example of a case where the object image of the entire human body is input as the input image.

(3) The body part detection example 3 is a body part detection example of a case where the object image of the human body below the neck is input as the input image.

(Step S105)

Next, in step S105, the object information acquisition unit 203b of the image information analysis unit 203 measures the real size (body height) of the object person in the input image.

The object information acquisition unit 203b analyzes the real size (body height) of the object, using the analysis technology about detection of an area of the object included in the input image (display image), detection of the floor or the ground of the space where the object is present, or an actual size and the like of the object.

Note that, in the bidirectional communication system, for example, an image is captured by a camera (for example, a wide-angle camera or the like that can always capture the entire body) on the object side, measured data is added as metadata corresponding to the image, and the metadata is transmitted together with the captured image. The apparatus side that executes the display processing may perform the processing such as the object real size analysis and the like using the meta information.

FIG. 10 is a diagram illustrating an object body height calculation example by the object information acquisition unit 203b in step S105.

First, in step S105a, the object information acquisition unit 203b detects an installation surface (floor) of the object.

Thereafter, in step S105b, the object information acquisition unit 203b calculates the body height of the object, using the body part detection result. Specifically, for example, the length from the head to the floor is calculated.

(Step S106)

Next, in step S106, the full-size image generation unit 204a of the display mode determination unit 204 executes processing of generating a full-size display image for displaying the object in life size according to the size, the image resolution, and the pixel pitch of the display area 107a, the real size (body height) of the object person, and the like.

Figure 11:
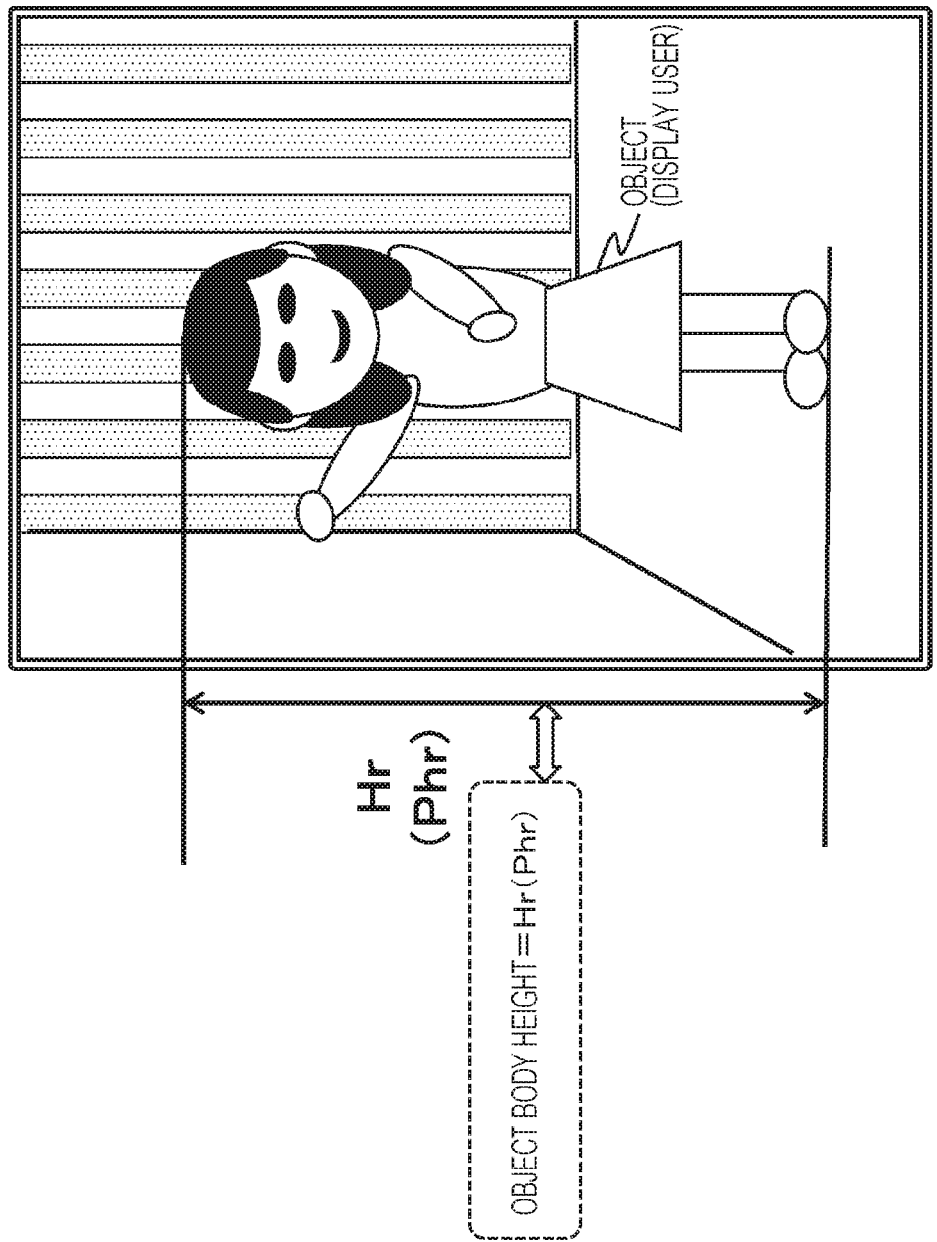
FIG. 11 is a diagram for describing an object full-size (life-size) display example.
Figure 12:
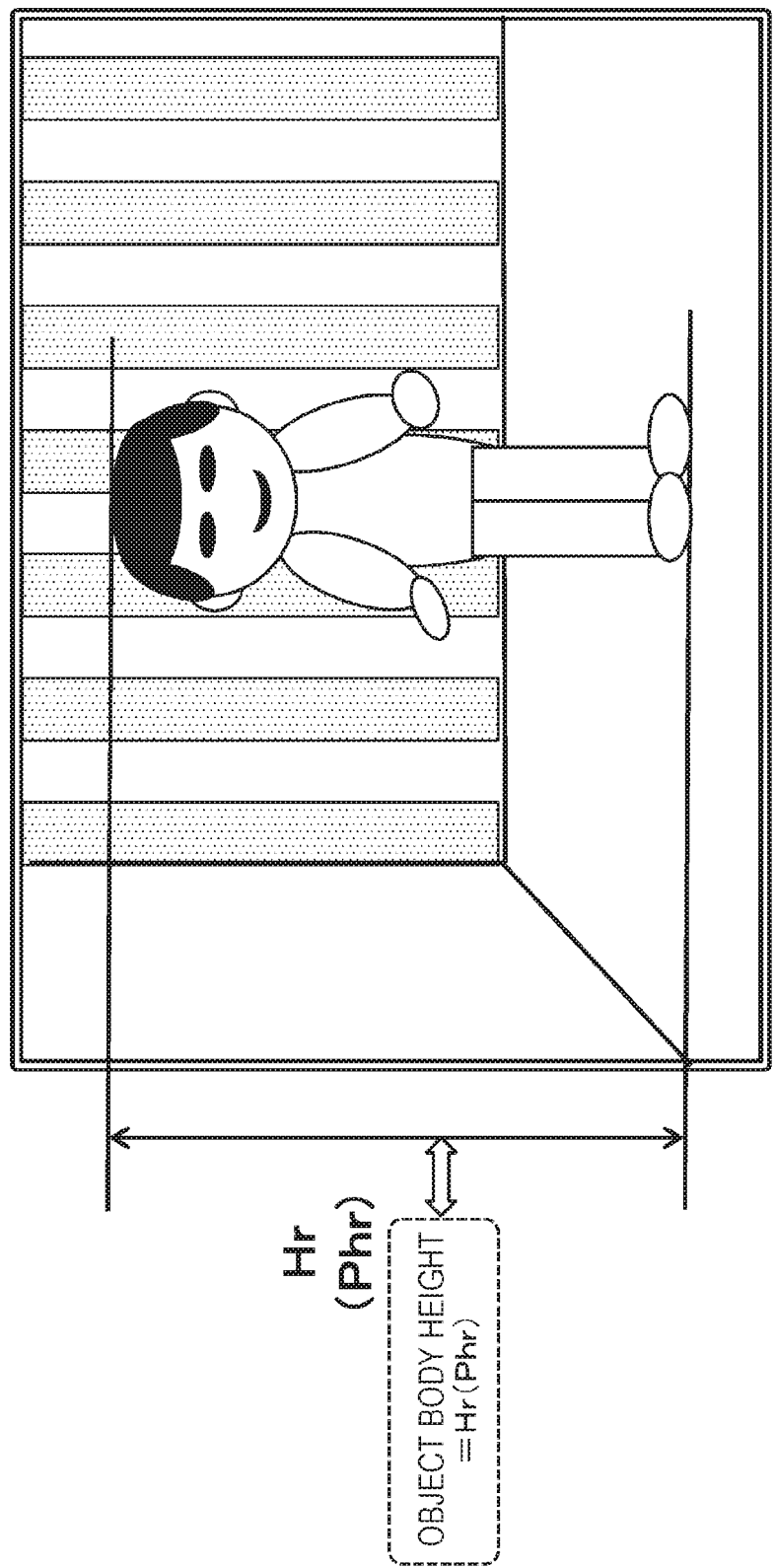
FIG. 12 is a diagram for describing an object full-size (life-size) display example.

FIGS. 11 and 12 are diagrams illustrating object full-size image display examples. The image size adjustment unit 204 determines the numbers of pixel of a width (Pwr (pixel)) and a height (Phr (pixel)) of a full-size image Gr so that the object is displayed in full size from the information of a pixel pitch pp (mm/pixel) of the display area 107a. The pixel pitch can be calculated from the information of the resolution that is a unique value to the display area 107a and the size of the display area 107a.

In FIGS. 11 and 12, the following equation (1) is established where the body height that is the height of the full-size object image is Hr (mm), and Phr (pixel) is expressed by the number of pixels:

$$\text{The body height} = Hr \text{ (mm)} = Phr \text{ (pixel)} \times pp \text{ (mm/pixel)} \quad (1)$$

Note that the examples illustrated in FIGS. 11 and 12 are examples in which the entire human body as the object can be displayed in the display area.

In reality, the entire object is not necessarily displayable on the display unit.

In the processing in step S107 and the subsequent steps illustrated in the flow in FIG. 8, the optimum display mode determination unit 204b executes the predefined optimum display mode determination algorithm, applying the specifications of the display area 107a acquired by the display area specification acquisition unit 201 and the object information analyzed in the image information analysis unit 203, to determine the optimum display mode.

(Step S107)

Determination processing in steps S107 to S109 illustrated in the flow in FIG. 8 is processing executed by the optimum display mode determination unit 204b of the display mode determination unit 204 illustrated in FIG. 3.

The optimum display mode determination unit 204b executes the predefined optimum display mode determination algorithm, applying the specifications of the display area 107a acquired by the display area specification acquisition unit 201 and the object information analyzed in the image information analysis unit 203, to determine the optimum display mode. Specifically, for example, the following determination processing is executed:

(Determination a) Determination processing as to whether or not the upper end of the display area is higher than the body height of the object person to be displayed.

(Determination b) Determination processing as to whether or not there is a missing area that cannot be displayed on the display unit due to full-size display of the object person to be displayed.

(Determination c) Determination processing as to whether or not a difference between a viewpoint position of the object person to be displayed and the viewpoint position of the viewing user is a predefined threshold or less.

(Determination d) Determination processing as to whether or not the object image to be displayed includes the head, and a missing part other than the head is at a predefined threshold ratio or less.

The optimum display mode determination unit 204*b* executes the optimum display mode determination algorithm including the determination processing (determination a) to (determination d), for example, to determine the optimal display mode. Specifically, the optimum display mode determination unit 204*b* determines the size and display position of the optimum display image, necessity of the mask processing, and the like.

First, in step S107, the optimum display mode determination unit 204*b* performs the above determination processing (determination a). That is, the following determination processing is executed:

(determination a) determination processing as to whether or not an upper end of the display area is higher than the body height of the object person to be displayed.

Specifically, the optimum display mode determination unit 204*b* determines whether or not the upper end of the display area 107*a* is higher than the body height of the object person. Note that the height of the upper end of the display area 107*a* is the height from the floor, ground, or the like on which the viewing user who is viewing the display image on the display unit is present.

The height of the upper end of the display area 107*a* is calculated using the information acquired by the display area information acquisition unit 201 in steps S101 and S102, that is, the display area information described with reference to FIG. 4.

Specifically, as illustrated in FIG. 4, the total of the following (a) and (b) is calculated as the height of the upper end of the display area 107*a*:

(a) the display area vertical size 222; and (b) the height 223 from the floor or the ground to the lower end of the display area.

The body height of the object person is the body height of the object acquired by the object information acquisition unit 203*b* of the image information analysis unit 203 in step S105.

In step S107, the upper end height of the display area, and the object body height are compared. That is, whether or not the following determination equation is established is determined.

The upper end height of the display area the object body height

When the above determination equation is established, that is, the upper end height of the display area is the object body height or more, the determination in step S107 is Yes, and the processing proceeds to step S108.

On the other hand, when the above determination equation is not established, that is, the upper end height of the display area is less than the object body height, the determination in step S107 is No, and the processing proceeds to step S124.

FIG. 13 is a diagram illustrating an example in which the upper end of the display area is higher than the body height of the object.

In this case, the entire head including the face of the object (display user) is displayed in the display area. Note that the object (display user) displayed on the display unit is a full size, and the height of the object (display user) accords with the body height of the object.

On the other hand, FIG. 14 is a diagram illustrating an example in which the upper end of the display area is lower than the body height of the object.

In this case, at least a part of the head including the face of the object (display user) cannot be displayed in the display area.

(Step S108)

In the determination processing in step S107, when the upper end height of the display area is the object body height or more, the determination in step S107 is Yes, and the processing proceeds to step S108.

In step S108, the optimum display mode determination unit 204*b* performs the above determination processing (determination b). That is, the following determination processing is executed:

(determination b) determination processing as to whether or not there is a missing area that cannot be displayed on the display unit due to full-size display of the object person to be displayed.

FIG. 15A is a diagram illustrating an example in which there is no part that is missed and cannot be displayed when displaying the object person in full size.

This missing part determination processing can be determined on the basis of the body parts detected in the body part detection unit 203*a* of the image information analysis unit 203, for example.

On the other hand, FIG. 15B is a diagram illustrating an example in which there is a part that is missed and cannot be displayed when displaying the object person in full size.

In FIG. 15B, for example, the body part detection unit 203*a* of the image information analysis unit 203 determines that there is a missing part in the feet as the body parts detected from the input image, and there is body parts that cannot be displayed.

In a case where it is determined that there is no missing area that cannot be displayed on the display unit due to the full-size display of the object person to be displayed in step S108, the determination result in step S108 is Yes and the processing proceeds to step S109.

On the other hand, in a case where it is determined that there is a missing area, the determination result in step S108 is No, and the processing proceeds to step S110.

(Step S109)

In a case where it is determined that there is no missing area that cannot be displayed on the display unit due to the full-size display of the object person to be displayed in step S108, the determination result in step S108 is Yes and the processing proceeds to step S109.

In step S109, the optimum display mode determination unit 204*b* performs the above determination processing (determination c). That is, the following determination processing is executed:

(determination c) determination processing as to whether or not a difference between a viewpoint position of the object person to be displayed and the viewpoint position of the viewing user is a predefined threshold or less.

Note that the threshold is a predefined threshold.

Further, the difference in viewpoint position is a difference in height between the viewpoint position of the object person and the viewpoint position of the viewing user.

Figure 16:
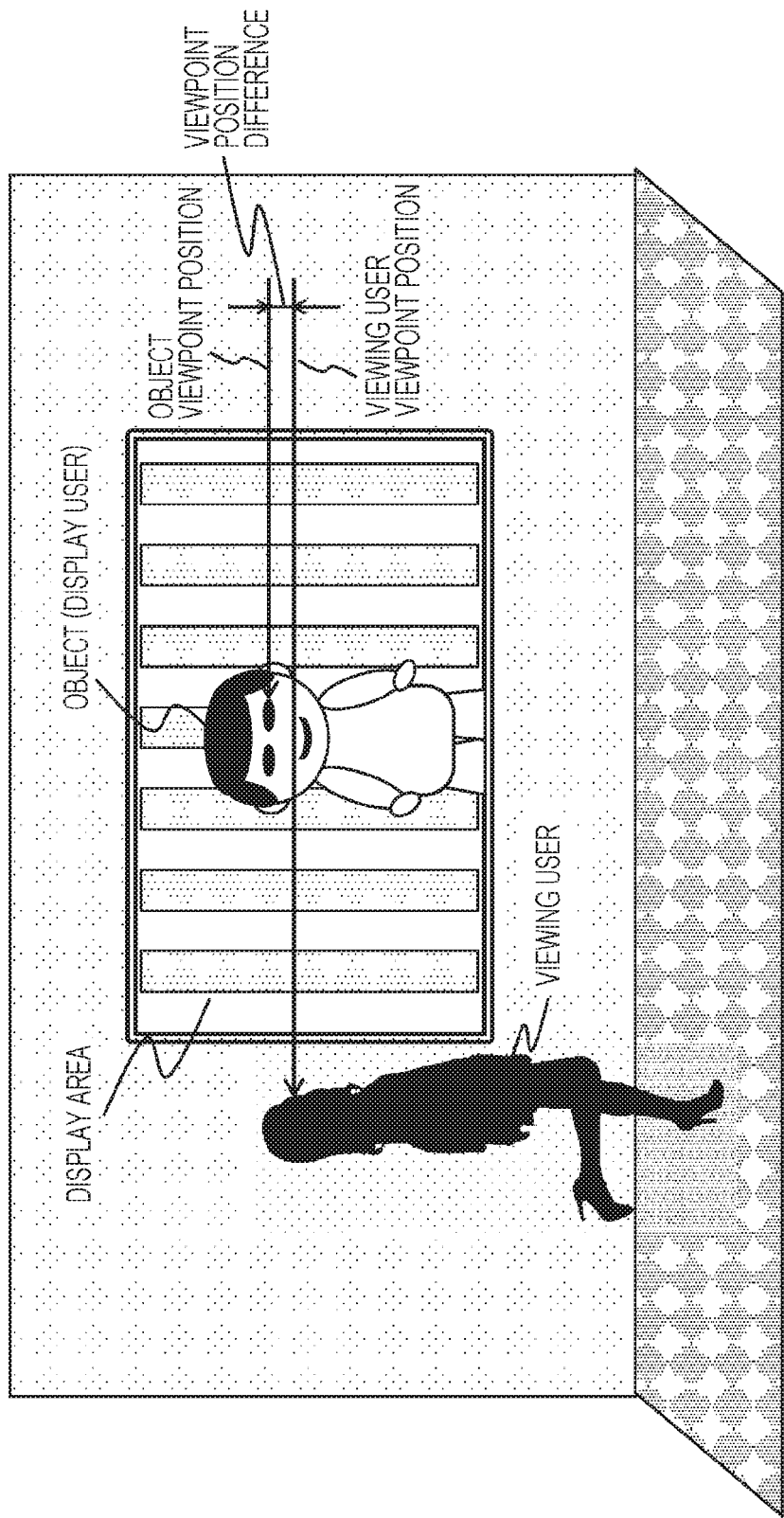
FIG. 16 is a diagram for describing a difference in viewpoint position between an object and a viewing user.

FIG. 16 is a diagram illustrating an example of a case in which the difference between the viewpoint position (height)

of the object (display user) and the viewpoint position (height) of the viewing user is small, and is the preset threshold or less.

Figure 17:
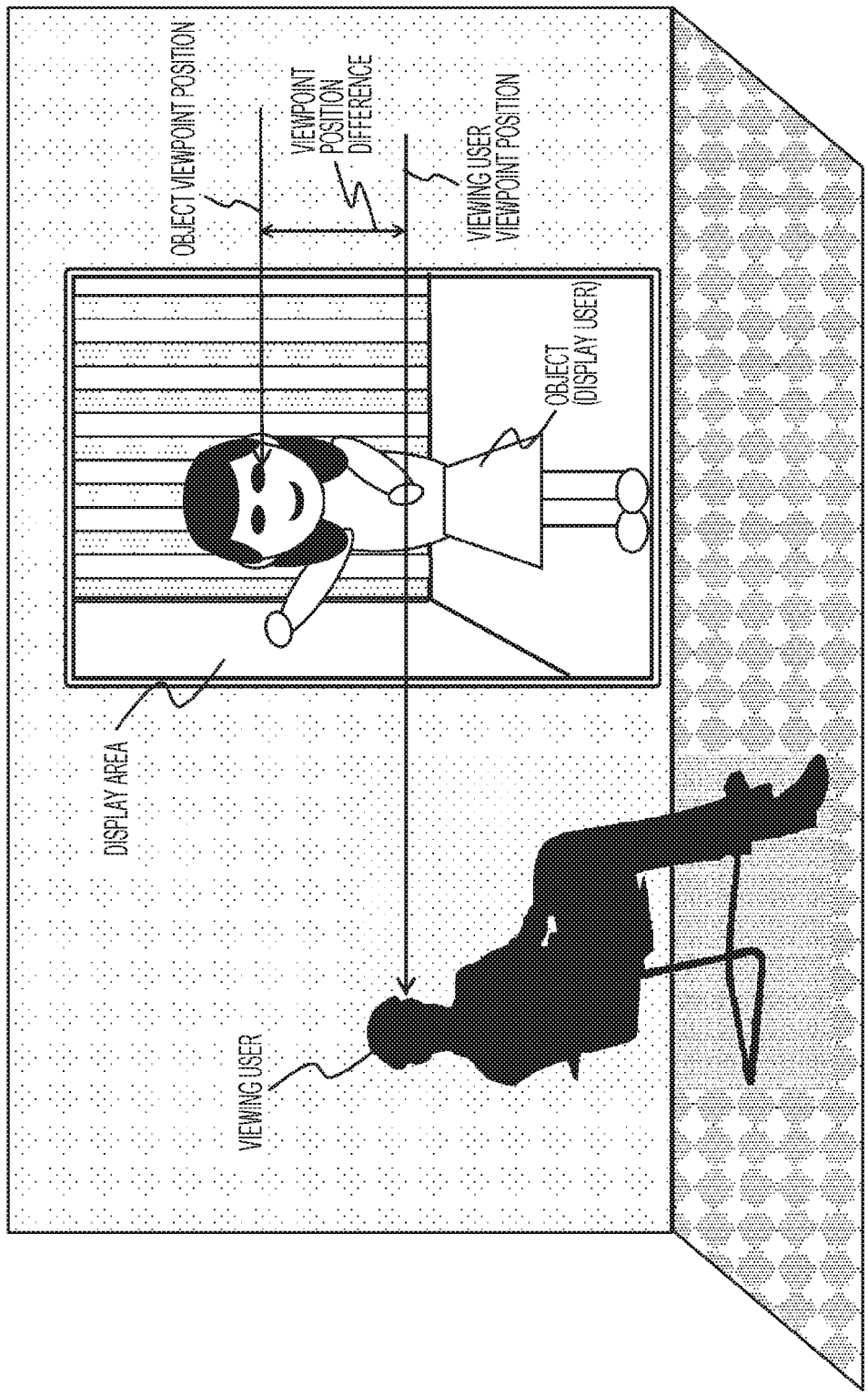
FIG. 17 is a diagram for describing a difference in viewpoint position between an object and a viewing user.

On the other hand, FIG. 17 is a diagram illustrating an example of a case in which the difference between the viewpoint position (height) of the object (display user) and the viewpoint position (height) of the viewing user is large, and is larger than the preset threshold.

In step S109, in a case where it is determined that the difference between the viewpoint position (height) of the object (display user) and the viewpoint position (height) of the viewing user is small and is the preset threshold or less, the determination result in step S109 is Yes and the processing proceeds to step S121.

On the other hand, in a case where it is determined that the difference between the viewpoint position (height) of the object (display user) and the viewpoint position (height) of the viewing user is small and is larger than the preset threshold, the determination result in step S109 is No and the processing proceeds to step S122.

(Step S121)

In step S109, in a case where it is determined that the difference between the viewpoint position (height) of the object (display user) and the viewpoint position (height) of the viewing user is small and is the preset threshold or less, the determination result in step S109 is Yes and the processing proceeds to step S121.

The processing in step S121 is object image display processing.

This processing is executed by the output image generation unit 205 illustrated in FIG. 3. The display image size adjustment unit 205a adjusts the display image size according to the display mode determined by the display mode determination unit 204, and the image display position determination unit 205b determines the display position of the object according to the display mode determined by the display mode determination unit 204 and generates and displays the output image on the display unit.

The processing in step S121 is object display processing-A, and processing of displaying the object in full size from the floor is executed.

Figure 18:
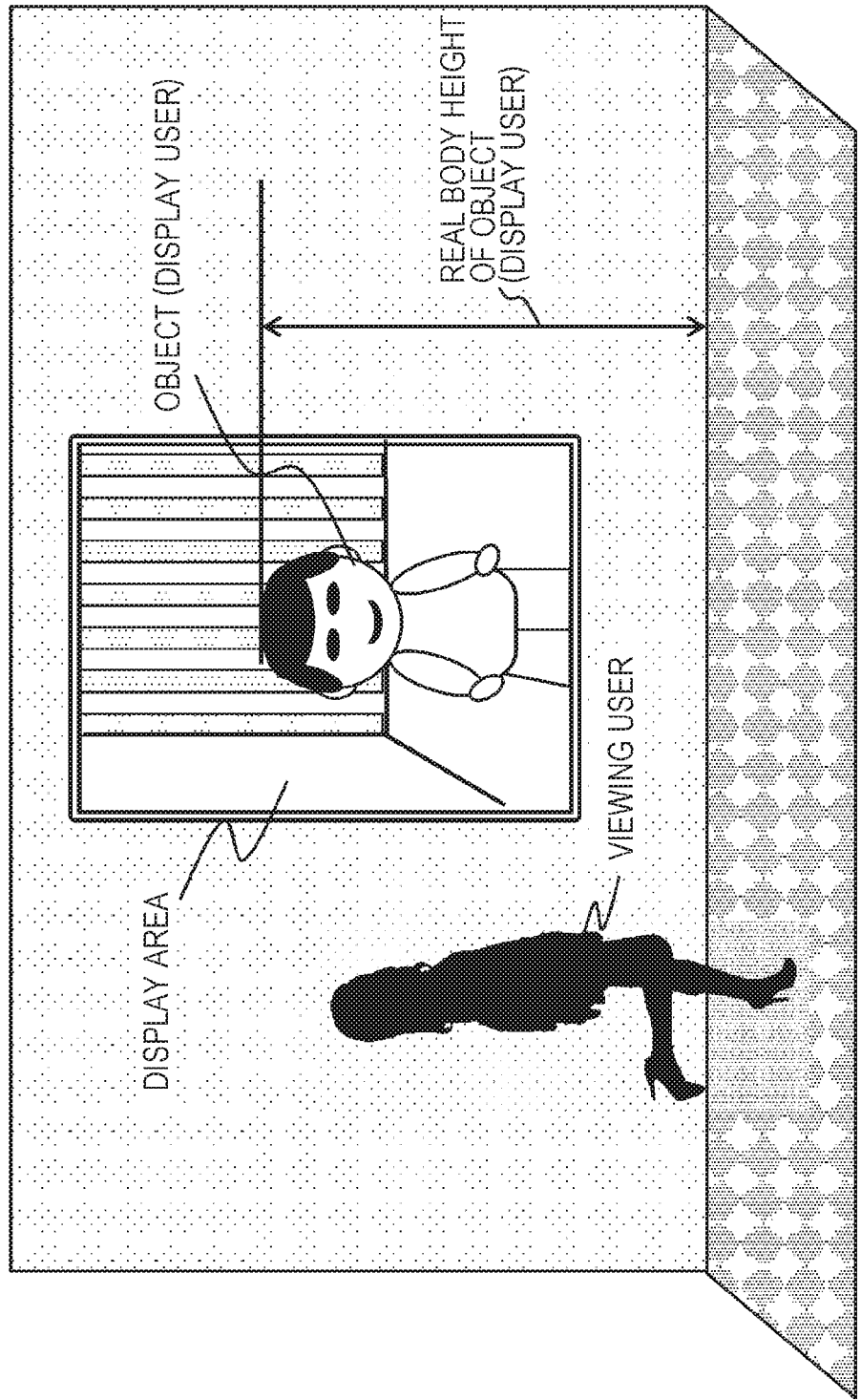
FIG. 18 is a diagram for describing an object full-size display example.
Figure 19:
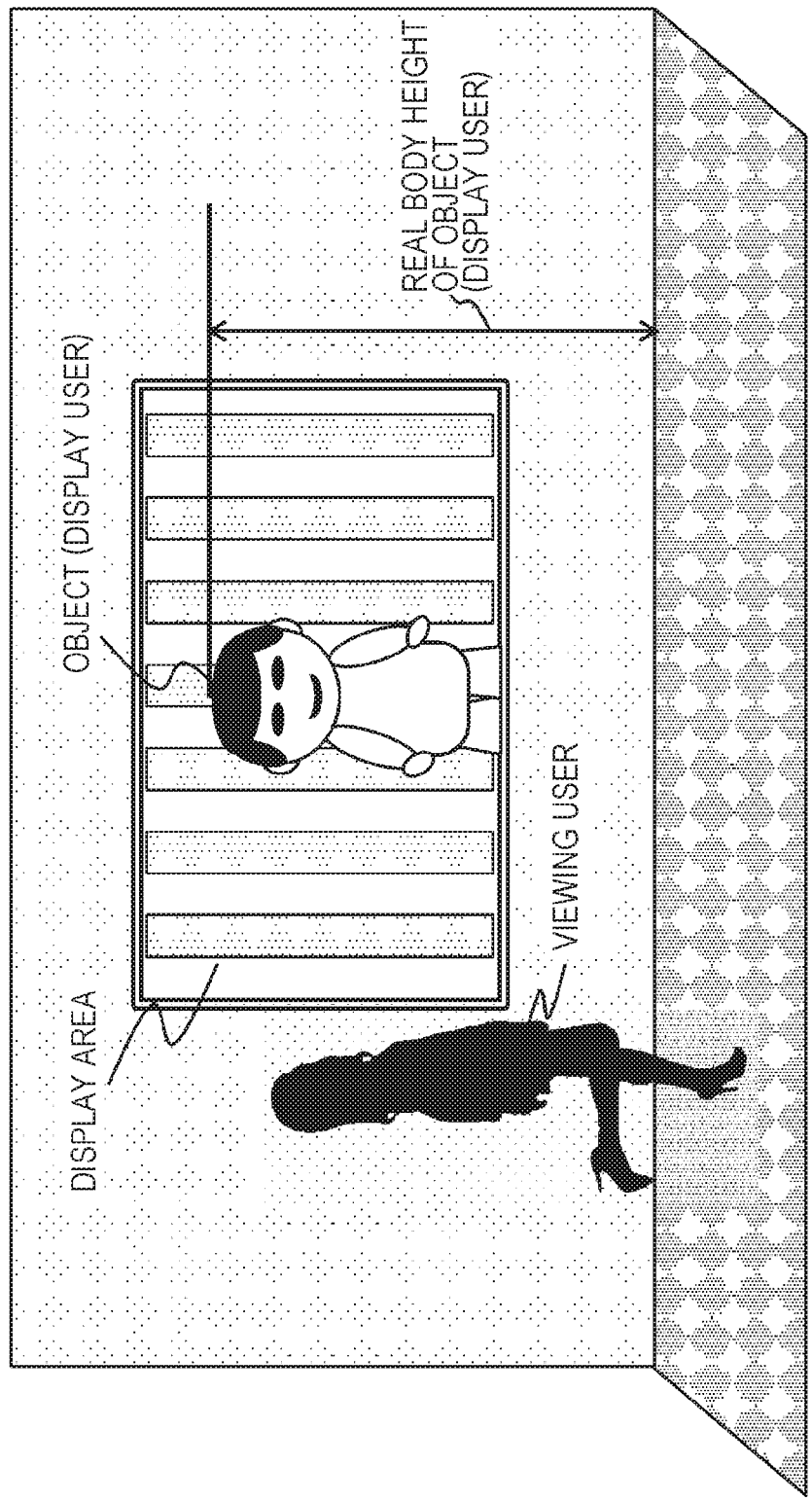
FIG. 19 is a diagram for describing an object full-size display example.
Figure 20:
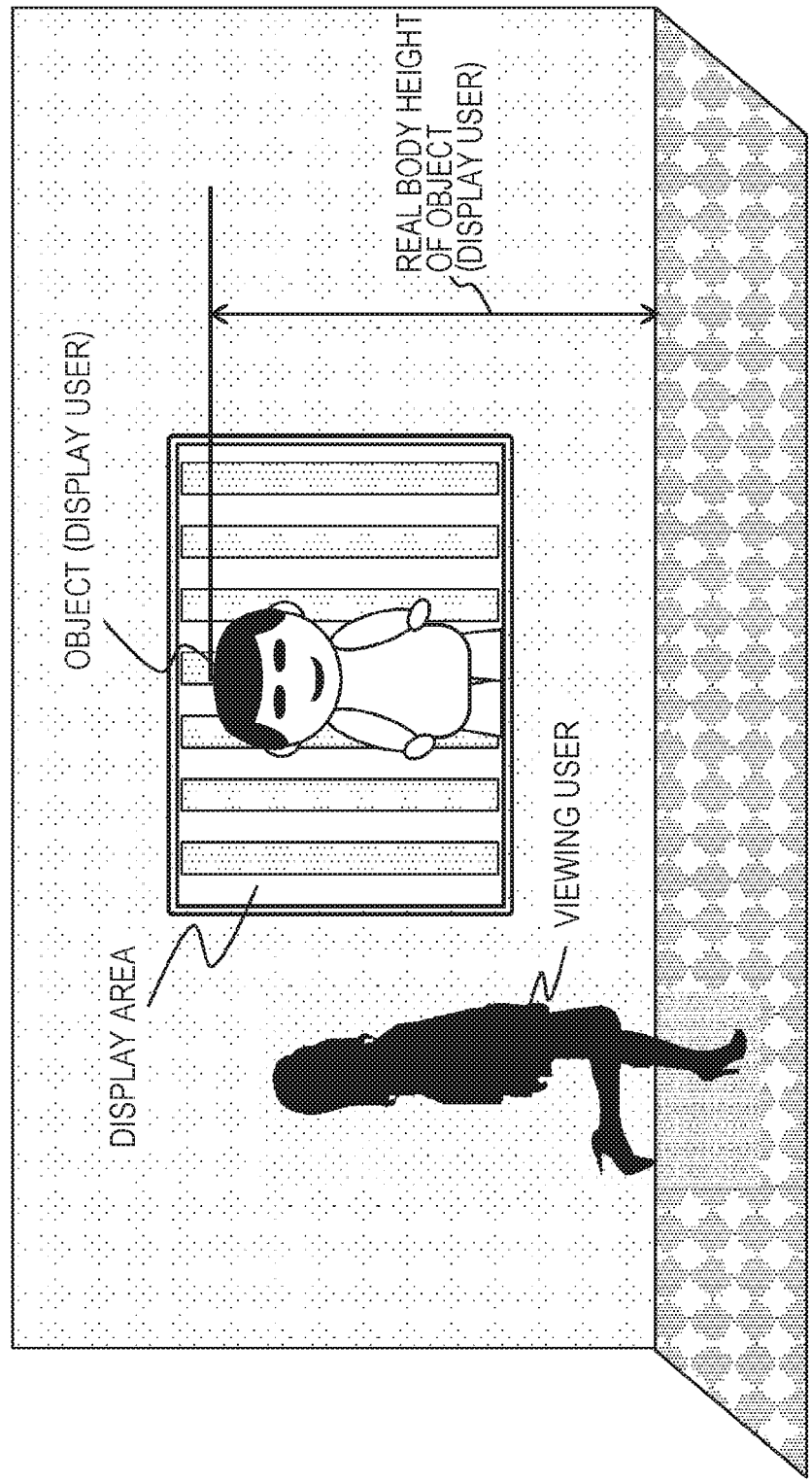
FIG. 20 is a diagram for describing an object full-size display example.

FIGS. 18 to 20 are diagrams illustrating examples of full-size display from the floor. Note that the floor serving as a base to display the object is the floor on the viewer side.

The example illustrated in FIG. 18 is an example in which the object (display user) is displayed in full size in a portrait display area. The height from the floor surface on which the viewing user is standing to the top of the head of the object (display user) is a height corresponding to the body height of the object (display user).

The example illustrated in FIG. 19 is an example in which the object (display user) is displayed in full size in a landscape display area. The height from the floor surface on which the viewing user is standing to the top of the head of the object (display user) is a height corresponding to the body height of the object (display user).

The example illustrated in FIG. 20 is an example in which the object (display user) is displayed in full size in a smaller landscape display area than the landscape display area illustrated in FIG. 19. The height from the floor surface on which the viewing user is standing to the top of the head of the object (display user) is a height corresponding to the body height of the object (display user).

(Step S122)

On the other hand, in step S109, in a case where it is determined that the difference between the viewpoint position (height) of the object (display user) and the viewpoint position (height) of the viewing user is large and is larger than the preset threshold, the determination result in step S109 is No and the processing proceeds to step S122.

The processing in step S122 is object image display processing.

This processing is executed by the output image generation unit 205 illustrated in FIG. 3. The display image size adjustment unit 205a adjusts the display image size according to the display mode determined by the display mode determination unit 204, and the image display position determination unit 205b determines the display position of the object according to the display mode determined by the display mode determination unit 204 and generates and displays the output image on the display unit.

The processing in step S122 is object display processing-B, and processing of generating and displaying the display image in which the viewpoints of the viewing user and the object (display user) are brought close to each other is executed. Note that the object image is a full-size image.

In other words, the object full-size image in which the gap in the viewpoint height between the viewing user and the object (display user) is made small is generated and output.

FIGS. 21A, 21B, 22A, and 22B are diagrams illustrating display images generated by the processing, that is, display image examples in which the viewpoint of the object (display user) is brought close.

FIGS. 21A and 21B is a diagram illustrating an example of generating a display image in which the gap in the viewpoint height between the viewing user and the object (display user) is made small by changing the display position of the object (display user) in the display area.

FIGS. 21A and 21B illustrate the following two diagrams:

FIG. 21A an input image having a large difference in viewpoint between the viewing user and the object (display user); and FIG. 21B a display image generated by executing image processing of bringing the viewpoints of the object (display user) and the viewing user close to each other.

FIG. 21A is an image before processing and FIG. 21B is an image after processing. The display image in which the viewpoints of the viewing user and the object (display user) are brought close to each other is generated as illustrated in FIG. 21B by changing the display position of the object (display user) included in the image in FIG. 21A.

Figure 22A:
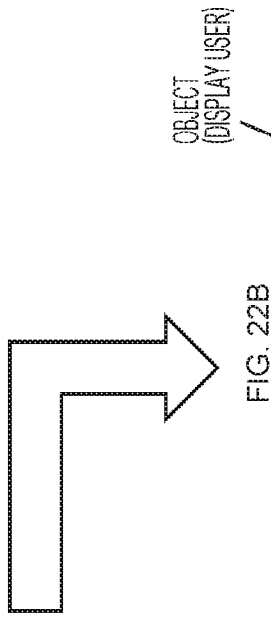
FIGS. 22A and 22B are diagrams for describing a display example of an image in which viewpoint positions of an object and a viewing user are brought close to each other.
Figure 22B:
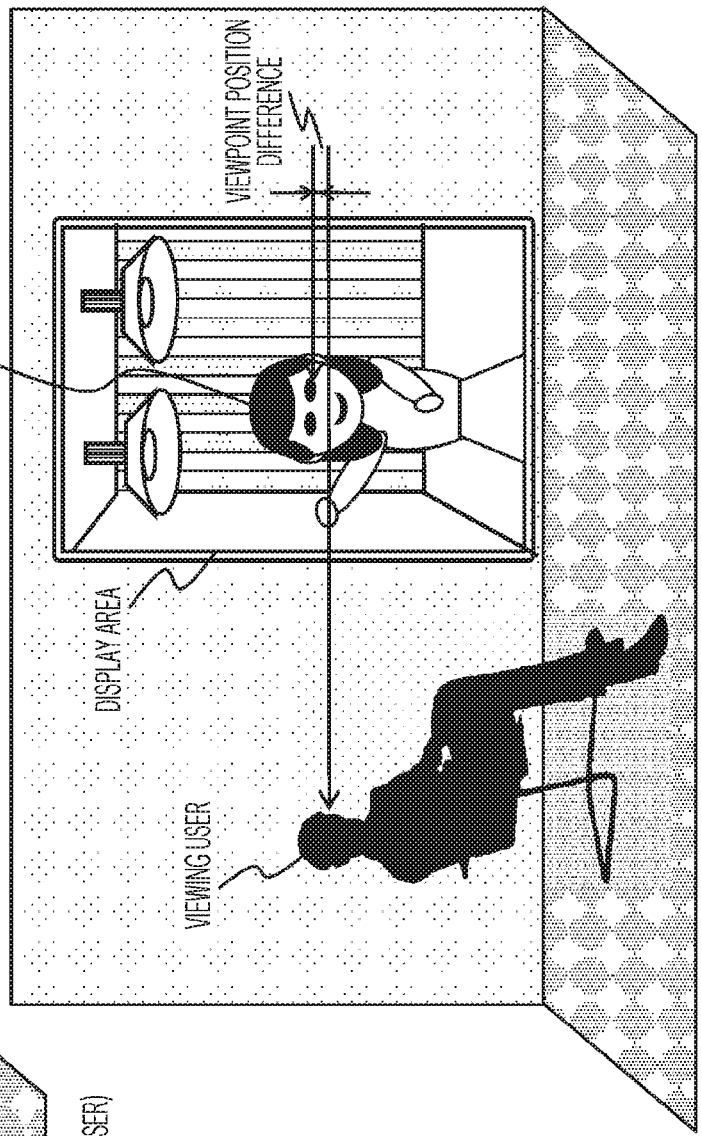

FIGS. 22A and 22B are diagrams illustrating an example of generating a display image in which the viewpoints of the viewing user and the object (display user) are brought close to each other by changing the viewpoint position of the 3D image model on the background in accordance with the display position change of the object (display user).

FIGS. 22A and 22B illustrate the following two diagrams:

FIG. 22A an input image having a large difference in viewpoint between the viewing user and the object (display user); and FIG. 2B a display image generated by executing image processing of bringing the viewpoints of the object (display user) and the viewing user close to each other.

FIG. 2A is an image before processing and FIG. 2B is an image after processing. A display image in which the viewpoints of the viewing user and the object (display user) are brought close to each other and the entire image including the background looks natural is generated by changing the display position of the object (display user) included in the image illustrated in FIG. 2A and changing the viewpoint position of the 3D image model of the background.

(Step S110)

Next, processing in step S110 and subsequent steps in the case where it is determined that there is a missing area that cannot be displayed on the display unit due to the full-size display of the object person to be displayed in step S108 will be described.

In a case where it is determined that there is a missing area that cannot be displayed on the display unit due to the full-size display of the object person to be displayed in step S108, the determination result in step S108 is No and the processing proceeds to step S110.

In step S110, the optimum display mode determination unit 204b performs the above determination processing (determination d). That is, the following determination processing is executed:

(determination d) determination processing as to whether or not an object image to be displayed includes the head, and a missing part other than the head is at a predefined threshold ratio or less.

Note that the threshold is a predefined threshold.

In step S110, in a case where it is determined that the object image to be displayed includes the head, and the missing part other than the head is at the predefined threshold ratio or less, the determination result in step S110 is Yes and the processing proceeds to step S123.

On the other hand, in a case where it is determined that the object image to be displayed includes the head, and the ratio of the missing part other than the head is larger than the predefined threshold ratio, the determination result in step S110 is No and the processing proceeds to step S124.

(Step S123)

In step S110, in a case where it is determined that the object image to be displayed includes the head, and the missing part other than the head is at the predefined threshold ratio or less, the determination result in step S110 is Yes and the processing proceeds to step S123.

The processing in step S123 is object image display processing.

This processing is executed by the output image generation unit 205 illustrated in FIG. 3. The display image size adjustment unit 205a adjusts the display image size according to the display mode determined by the display mode determination unit 204, and the image display position determination unit 205b determines the display position of the object according to the display mode determined by the display mode determination unit 204 and generates and displays the output image on the display unit.

The processing in step S123 is object display processing-C, and processing of hiding the missing part of the object is executed and processing of displaying the object in full size is executed.

FIGS. 23A, 23B, 24A, and 24B are diagrams illustrating display examples in which the processing of hiding the missing part of the object is executed and the object is displayed in full size.

The example illustrated in FIGS. 23A and 23B is an example in which the object (display user) is displayed in full size in the portrait display area, and is an example in which a mask area is set to the missing area on the feet of the object not included in the captured image to obtain the display image.

The example illustrated in FIGS. 24A and 24B is an example in which the object (display user) is displayed in full size in the portrait display area, and is an example in which a table is superimposed and displayed on the missing area on the feet of the object not included in the captured image as a masking object.

With such setting, the object (display user) can be displayed without a feeling of strangeness.

(Step S124)

On the other hand, in step S110, in a case where it is determined that the object image to be displayed includes the head, and the ratio of the missing part other than the head is larger than the predefined threshold ratio, the determination result in step S110 is No and the processing proceeds to step S124.

The processing in step S124 is object image display processing.

This processing is executed by the output image generation unit 205 illustrated in FIG. 3. The display image size adjustment unit 205a adjusts the display image size according to the display mode determined by the display mode determination unit 204, and the image display position determination unit 205b determines the display position of the object according to the display mode determined by the display mode determination unit 204 and generates and displays the output image on the display unit.

The processing in step S124 is object display processing-D, and full-size display of the object is not executed, and display processing giving priority to composition is executed.

FIGS. 25A and 25B illustrate the following two diagrams:

FIG. 25A an object full-size display example with a large missing part; and

FIG. 25B a composition-priority object display example with a large missing part.

Note that the image display giving priority to composition is, for example, processing of making the ratio of the object occupying the display area large, or the like. Specifically, for example, processing of generating and displaying an image in which the presence of the missing part can be ignored, by such as displaying the face of the object large, is performed.

The image processing apparatus of the present disclosure performs, as described with reference to the flowcharts in FIGS. 7 and 8, the various types of processing for executing the optimum image display (steps S107 to S110), and performs display processing of the object (display user) in the display mode determined according to the determination results, in the optimum display mode determination unit 204b of the display mode determination unit 204.

The determination processing executed by the optimum display mode determination unit 204b of the display mode determination unit 204 is the following processing:

(determination a (step S107)) determination processing as to whether or not an upper end of the display area is higher than the body height of the object person to be displayed;

(determination b (step S108)) determination processing as to whether or not there is a missing area that cannot be displayed on the display unit by full-size display of the object person to be displayed;

(determination c (step S109)) determination processing as to whether or not a difference between a viewpoint position of the object person to be displayed and the viewpoint position of the viewing user is a predefined threshold or less; and (determination d (step S110)) determination processing as to whether or not an object image to be displayed includes the head, and a missing part other than the head is at a predefined threshold ratio or less.

19

Four types of different display processing (steps S121 to S124) are selectively executed according to the determination results. Specifically, the following four types of display processing:

((display processing A (step S121)) displaying a full-size object from the floor (viewing user's standing position);

((display processing B) (step S122)) executing image processing of bringing the viewpoints of the viewing user and the object close to each other and executing the object display;

((display processing C) (step S123)) executing image processing to hide the missing part of the object and executing the full-size display of the object; and ((display processing D) (step S124)) generating an image giving priority to composition without sticking to the full-size display of the object and executing object display.

As described above, the image processing apparatus of the present disclosure is configured to determine the optimum display mode according to the image area information, the object information, the viewer information, and the like, and to generate and display the image including the object in the determined display mode. As a result of the processing, optimum image outputs according to various display units and input images are realized.

Therefore, for example, in the case of performing bidirectional communication, the viewing user who executes the communication while viewing the object displayed on the display unit can perform communication without a feeling of strangeness.

5. CONCLUSION OF CONFIGURATION OF PRESENT DISCLOSURE

The embodiments of the present disclosure have been described in detail with reference to the specific embodiments. However, it is obvious that those skilled in the art can make modifications and substitutions of the embodiments without departing from the gist of the present disclosure. That is, the present invention has been disclosed in the form of exemplification, and should not be restrictively interpreted. To judge the gist of the present disclosure, the scope of claims should be taken into consideration.

Note that the technology disclosed in the present specification can have the following configurations.

(1) An image processing apparatus including:
a display area information acquisition unit configured to acquire display area information of a display unit;
an image acquisition unit configured to acquire an input image including an object to be displayed on the display unit;
an image information analysis unit configured to analyze the input image;
a display mode determination unit configured to determine a display mode of the object to be displayed on the display unit, applying an analysis result of the image information analysis unit; and
an output image generation unit configured to generate an output image to be displayed on the display unit according to the display mode determined by the display mode determination unit.

(2) The image processing apparatus according to (1), in which
the display mode determination unit
determines whether or not an upper end of a display area is higher than a body height of an object person,

20 the output image generation unit
executes processing of generating an output image including a full-size image of the object in a case where the upper end of the display area is higher than the body height of the object person, and
generates a composition-priority output image in a case where the upper end of the display area is not higher than the body height of the object person.

(3) The image processing apparatus according to (2), in which the composition-priority output image is an output image including a face area of the object.

(4) The image processing apparatus according to any one of (1) to (3), in which
the display mode determination unit
determines whether or not a missing area occurs in a case where the object person is displayed in full size, and
the output image generation unit
generates an output image for which mask processing for the missing area has been performed or a composition-priority output image in a case where it is determined that the missing area occurs.

(5) The image processing apparatus according to (4), in which the output image for which the mask processing has been performed is an image in which a masking object to hide the missing area is superimposed on an object image (6) The image processing apparatus according to any one of (1) to (5), in which
the display mode determination unit
determines whether or not a missing area occurs in a case where the object person is displayed in full size,
further determines whether or not a head is included in the input image, and the missing area is at a fixed ratio or less, in a case where it is determined that the missing area occurs, and
the output image generation unit
generates an output image in which mask processing for the missing area has been performed in a case where it is determined that the head is included in the input image, and the missing area is at the fixed ratio or less, and
generates a composition-priority output image in a case where it is determined that the head is included in the input image, and the missing area is not at the fixed ratio or less.

(7) The image processing apparatus according to any one of (1) to (6), in which
the display mode determination unit
determines whether or not a line of sight height difference between a line of sight height of the object to be displayed on the display unit and a line of sight height of a viewing user who views the display unit is a threshold or less, and
the output image generation unit
generates an output image in which the line of sight height difference is made small in a case where the line of sight height difference is not the threshold or less.

(8) The image processing apparatus according to (7), in which
the output image generation unit
generates an output image in which a display position of the object is changed to make the line of sight height difference small in a case where the line of sight height difference is not the threshold or less.

(9) The image processing apparatus according to (7), in which
the output image generation unit
generates an output image in which an object image with a changed display position is superimposed on a background image with a changed observation viewpoint position in a case where the line of sight height difference is not the threshold or less.

(10) The image processing apparatus according to any one of (1) to (9), further including:
a communication unit configured to execute data communication, in which
the image information analysis unit
executes processing of analyzing the input image received by the communication unit.

(11) The image processing apparatus according to any one of (1) to (10), further including:
an imaging unit, in which
the display mode determination unit
determines the display mode of the object to be displayed on the display unit, applying information of a viewing user imaged by the imaging unit.

(12) An image processing system that executes image reception/transmission between a first image processing apparatus and a second image processing apparatus connected by a network,
the first image processing apparatus including:
a display area information acquisition unit configured to acquire display area information of a display unit;
a communication unit configured to receive an input image including an object to be displayed on the display unit from the second image processing apparatus;
an image information analysis unit configured to analyze the input image;
a display mode determination unit configured to determine a display mode of the object to be displayed on the display unit, applying an analysis result of the image information analysis unit; and
an output image generation unit configured to generate an output image to be displayed on the display unit according to the display mode determined by the display mode determination unit.

(13) An image processing method executed in an image processing apparatus, the method including:
a display area information acquisition step of acquiring, by a display area information acquisition unit, a display area information of a display unit;
an image acquisition step of acquiring, by an image acquisition unit, an input image including an object to be displayed on the display unit;
an image information analysis step of analyzing, by an image information analysis unit, the input image;
a display mode determination step of determining, by a display mode determination unit, a display mode of the object to be displayed on the display unit, applying an analysis result of the image information analysis unit; and
an output image generation step of generating, by an output image generation unit, an output image to be displayed on the display unit according to the display mode determined by the display mode determination unit.

(14) A program for causing an image processing apparatus to execute image processing including:
a display area information acquisition step of acquiring, by a display area information acquisition unit, a display area information of a display unit;
an image acquisition step of acquiring, by an image acquisition unit, an input image including an object to be displayed on the display unit;
an image information analysis step of analyzing, by an image information analysis unit, the input image;
a display mode determination step of determining, by a display mode determination unit, a display mode of the object to be displayed on the display unit, applying an analysis result of the image information analysis unit; and
an output image generation step of generating, by an output image generation unit, an output image to be displayed on the display unit according to the display mode determined by the display mode determination unit.

Further, the series of processing described in the specification can be executed by hardware, software, or a combined configuration of the hardware and software. In the case of executing the processing by software, a program, which records the processing sequence, can be installed and executed in a memory in a computer incorporated in dedicated hardware, or the program can be installed and executed in a general-purpose computer capable of executing various types of processing. For example, the program can be recorded in the recording medium in advance. Other than the installation from the recording medium to the computer, the program can be received via a network such as a local area network (LAN) or the Internet and can be installed to a recording medium such as a built-in hard disk.

Note that the various types of processing described in the specification may be executed not only in chronological order as described but also in parallel or individually depending on the processing capability of the device executing the process or as required. Further, the system in the present specification is a logical aggregate configuration of a plurality of devices, and is not limited to devices having respective configurations within the same housing.

INDUSTRIAL APPLICABILITY

As described above, according to the configuration of an embodiment of the present disclosure, for example, the configuration to make the object image to be displayed on the image processing apparatus that executes bidirectional communication be an optimum display image according to the types of information of the display unit, the object, the viewer, and the like is realized.

Specifically, the display area information acquisition unit acquires the display area information of the display unit, and the image acquisition unit acquires the input image including the object to be displayed on the display unit. Further, the image information analysis unit executes input image analysis processing, and the display mode determination unit determines the display mode of the object to be displayed on the display unit, applying an analysis result, and displays the output image generated according to the determined display mode on the display unit. Processing for the missing portion of the object in the case of performing the full-size display, correction of the line of sight position, and the like are executed, and natural display of the object is executed.

With the configuration, for example, the configuration to make the object image to be displayed on the image processing apparatus that executes bidirectional communication be an optimum display image according to the types of information of the display unit, the object, the viewer, and the like is realized.

REFERENCE SIGNS LIST

10, 20 Image processing apparatus
11, 21 Display unit (display)
12, 22 Camera
13, 23 Speaker
30 Network
100 Image processing apparatus
101 Controller
102 ROM
103 RAM 104 Bus
105 Input/output interface
106 Imaging unit
107 Display unit
107a Display area
108 Operation reception unit
109 Storage unit
110 Communication unit
201 Display area information acquisition unit
202 Image acquisition unit
203 Image information analysis unit
203a Body part detection unit
203b Object information acquisition unit
204 Display mode determination unit
204a Full-size image generation unit
204b Optimum display mode determination unit
205 Output image generation unit
205a Display image size adjustment unit
205b Image display position determination unit
206 Reproduction unit

The invention claimed is:

1. An image processing apparatus, comprising:
a processor configured to:
acquire display area information of a display device;
acquire an input image, wherein
the input image includes an object;
the object comprises an object person, and
the display device displays the object person;
determine a display mode of the object in the analyzed input image, wherein the determined display mode is based on a determination whether an upper end of a display area of the display device is higher than a body height of the object person in the input image; and
generate an output image based on the determined display mode, wherein
the output image includes a full-size image of the object in a case the upper end of the display area is higher than the body height of the object person,
the output image is a composition-priority image in a case the upper end of the display area is lower than the body height of the object person, and
the display device displays the output image.

2. The image processing apparatus according to claim 1, wherein the composition-priority image includes a face area of the object.

3. The image processing apparatus according to claim 1, wherein the processor is further configured to:
determine occurrence of a missing area in the input image in a case the object person is displayed in full size;
generate one of the output image with mask processing for the missing area or the composition-priority image based on the occurrence of the missing area in the input image.

4. The image processing apparatus according to claim 3, wherein
the output image with the mask processing is an image with a masking object superimposed on an image of the object, and
the masking object hides the missing area.

5. The image processing apparatus according to claim 1, wherein the processor is further configured to:
determine occurrence of a missing area in the input image based on display of the object person in full size;
determine each of inclusion of a head in the input image and the missing area is at equal to or less than a fixed ratio based on the occurrence of the missing area;
generate the output image with mask processing for the missing area in the input image in a case the head is included in the input image and the missing area is at equal to or less than the fixed ratio; and
generate the composition-priority image in a case the head is included in the input image and the missing area is at a ratio that is greater than the fixed ratio.

6. The image processing apparatus according to claim 1, wherein the processor is further configured to:
determine whether a line of sight height difference between a line of sight height of the object and a line of sight height of a viewing user is equal to or less than a threshold height; and
generate the output image with a decrease in the line of sight height difference in a case the line of sight height difference is greater than the threshold height.

7. The image processing apparatus according to claim 6, wherein
the processor is further configured to generate the output image with a changed display position of the object in a case the line of sight height difference is greater than the threshold, and
the changed display position of the object causes a decrease in the line of sight height difference.

8. The image processing apparatus according to claim 6, wherein
the generated output image includes an image of the object with a changed display position, and
the image of the object is superimposed on a background image with a changed observation viewpoint position in a case the line of sight height difference is greater than the threshold.

9. The image processing apparatus according to claim 1, wherein the processor is further configured to:
execute data communication; and
analyze the input image received as the communicated data.

10. The image processing apparatus according to claim 1, wherein the processor is further configured to apply information of a viewing user on the output image.

11. An image processing system, comprising:
a first image processing apparatus; and
a second image processing apparatus connected to the first image processing apparatus by a network, wherein the first image processing apparatus comprises:
a processor configured to:
acquire display area information of a display device;
receive an input image from the second image processing apparatus, wherein
the input image includes an object,
the object comprises an object person, and
the display device displays the object person;
analyze the input image;
determine a display mode of the object in the analyzed input image, wherein the determined display mode is based on a determination whether an upper end of a display area of the display device is higher than a body height of the object person in the input image; and
generate an output image based on the determined display mode, wherein
the output image includes a full-size image of the object in a case the upper end of the display area is higher than the body height of the object person, the output image is a composition-priority image in a case the upper end of the display area is lower than the body height of the object person, and
the display device displays the output image.

12. An image processing method, comprising:
in an image processing apparatus:
acquiring, by a processor, display area information of a display device;
acquiring, by the processor, an input image including an object, wherein
the object comprises an object person, and
the display device displays the object person;
analyzing, by the processor, the input image;
determining, by the processor, a display mode of the object, wherein the determined display mode is based on a determination whether an upper end of a display area of the display device is higher than a body height of the object person in the input image; and
generating, by the processor, an output image based on the determined display mode, wherein
the output image includes a full-size image of the object in a case the upper end of the display area is higher than the body height of the object person,
the output image is a composition-priority image in a case the upper end of the display area is lower than the body height of the object person, and
the display device displays the output image.

13. A non-transitory computer-readable medium having stored thereon, computer-executable instructions which, when executed by a computer, cause the computer to execute operations, the operations comprising:
acquiring a display area information of a display device;
acquiring an input image including an object, wherein
the object comprises an object person, and
the display device displays the object person;
analyzing the input image;
determining a display mode of the object, wherein the determined display mode is based on a determination whether an upper end of a display area of the display device is higher than a body height of the object person in the input image; and
generating an output image based on the determined display mode, wherein
the output image includes a full-size image of the object in a case the upper end of the display area is higher than the body height of the object person,
the output image is a composition-priority image in a case the upper end of the display area is lower than the body height of the object person, and
the display device displays the output image.

\* \* \* \* \*